United States Patent
Morgan et al.

(10) Patent No.: US 11,226,128 B2
(45) Date of Patent: Jan. 18, 2022

(54) INDOOR AIR QUALITY AND OCCUPANT MONITORING SYSTEMS AND METHODS

(71) Applicant: EMERSON CLIMATE TECHNOLOGIES, INC., Sidney, OH (US)

(72) Inventors: Stuart K. Morgan, West Chester, OH (US); Hung M. Pham, Dayton, OH (US); Brian R. Butler, Centerville, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 0 days.

(21) Appl. No.: 17/048,798

(22) PCT Filed: Apr. 19, 2019

(86) PCT No.: PCT/US2019/028391
§ 371 (c)(1),
(2) Date: Oct. 19, 2020

(87) PCT Pub. No.: WO2019/204779
PCT Pub. Date: Oct. 24, 2019

(65) Prior Publication Data
US 2021/0116144 A1 Apr. 22, 2021

Related U.S. Application Data

(60) Provisional application No. 62/660,346, filed on Apr. 20, 2018.

(51) Int. Cl.
*F24F 11/64* (2018.01)
*F24F 11/56* (2018.01)
(Continued)

(52) U.S. Cl.
CPC .............. *F24F 11/64* (2018.01); *F24F 11/56* (2018.01); *G05B 19/042* (2013.01);
(Continued)

(58) Field of Classification Search
CPC ........ F24F 11/64; F24F 11/56; F24F 2110/20; F24F 2110/64; F24F 2110/70;
(Continued)

(56) References Cited

U.S. PATENT DOCUMENTS

| 4,135,370 A | 1/1979 | Hosoda et al. |
| 4,136,529 A | 1/1979 | McCarty |

(Continued)

FOREIGN PATENT DOCUMENTS

| CN | 102019120 A | 4/2011 |
| CN | 102353751 A | 2/2012 |

(Continued)

OTHER PUBLICATIONS

"Clean Your Air with Keen Home Smart Filters", Keen Home, Inc., <https://keenhome.io/pages/smart-filter> 2018.

(Continued)

*Primary Examiner* — Charles R Kasenge
(74) *Attorney, Agent, or Firm* — Harness, Dickey & Pierce, P.L.C.

(57) ABSTRACT

A condition identification module is configured to, based on output from the at least one of a microphone and a camera, indicate an occurrence of a user having a physical condition. A correlation module is configured to, based on the occurrence of the user having the physical condition and at least one of a temperature of air, a relative humidity of air, an amount of particulate of at least a predetermined size present in air, an amount of VOCs present in air, and an amount of carbon dioxide present in air, selectively identify the presence of a correlation between the occurrence of the user (Continued)

having the physical condition and the at least one of the temperature, the RH, the amount of particulate, the amount of VOCs, and the amount of carbon dioxide.

19 Claims, 21 Drawing Sheets

(51) Int. Cl.
| | | |
|---|---|---|
| *G05B 19/042* | (2006.01) | |
| *F24F 110/20* | (2018.01) | |
| *F24F 110/64* | (2018.01) | |
| *F24F 110/70* | (2018.01) | |
| *F24F 120/14* | (2018.01) | |
| *F24F 110/66* | (2018.01) | |
| *F24F 110/10* | (2018.01) | |

(52) U.S. Cl.
CPC ....... *F24F 2110/10* (2018.01); *F24F 2110/20* (2018.01); *F24F 2110/64* (2018.01); *F24F 2110/66* (2018.01); *F24F 2110/70* (2018.01); *F24F 2120/14* (2018.01); *G05B 2219/2614* (2013.01)

(58) Field of Classification Search
CPC .............. F24F 2120/14; F24F 2110/66; F24F 2110/10; F24F 11/62; F24F 11/59; G05B 19/042; G05B 2219/2614; Y02B 30/70
See application file for complete search history.

(56) References Cited

U.S. PATENT DOCUMENTS

| | | | |
|---|---|---|---|
| 4,735,054 | A | 4/1988 | Beckey |
| 4,873,649 | A | 10/1989 | Grald et al. |
| 4,922,808 | A | 5/1990 | Smith |
| 4,977,818 | A | 12/1990 | Taylor et al. |
| 5,067,394 | A | 11/1991 | Cavallero |
| 5,129,234 | A | 7/1992 | Alford |
| 5,259,553 | A | 11/1993 | Shyu |
| 5,267,897 | A | 12/1993 | Drees |
| 5,303,561 | A | 4/1994 | Bahel et al. |
| 5,351,855 | A | 10/1994 | Nelson et al. |
| 5,394,934 | A | 3/1995 | Rein et al. |
| 5,428,964 | A | 7/1995 | Lobdell |
| 5,520,328 | A | 5/1996 | Bujak, Jr. |
| 5,598,715 | A | 2/1997 | Edmisten |
| 5,707,005 | A | 1/1998 | Kettler et al. |
| 5,832,411 | A | 11/1998 | Schatzmann et al. |
| 5,887,784 | A | 3/1999 | Haas |
| 5,892,690 | A | 4/1999 | Boatman et al. |
| 5,904,896 | A | 5/1999 | High |
| 6,161,764 | A | 12/2000 | Jatnieks |
| 6,187,263 | B1 | 2/2001 | Nielsen |
| 6,230,980 | B1 | 5/2001 | Hudson |
| 6,251,344 | B1 | 6/2001 | Goldstein |
| 6,288,646 | B1 | 9/2001 | Skardon |
| 6,358,374 | B1 | 3/2002 | Obee et al. |
| 6,369,716 | B1 | 4/2002 | Abbas et al. |
| 6,377,858 | B1 | 4/2002 | Koeppe |
| 6,391,102 | B1 | 5/2002 | Bodden et al. |
| 6,392,536 | B1 | 5/2002 | Tice et al. |
| 6,394,427 | B1 | 5/2002 | Guetersloh et al. |
| 6,406,367 | B1 | 6/2002 | Chou et al. |
| 6,406,506 | B1 | 6/2002 | Moredock et al. |
| 6,423,118 | B1 | 7/2002 | Becerra et al. |
| 6,448,896 | B1 | 9/2002 | Bankus et al. |
| 6,466,133 | B1 | 10/2002 | Skardon |
| 6,493,638 | B1 | 12/2002 | McLean et al. |
| 6,494,053 | B1 | 12/2002 | Forkosh et al. |
| 6,494,940 | B1 | 12/2002 | Hak |
| 6,503,462 | B1 | 1/2003 | Michalakos et al. |
| 6,557,365 | B2 | 5/2003 | Dinnage et al. |
| 6,578,770 | B1 | 6/2003 | Rosen |
| 6,582,295 | B1 | 6/2003 | Abouchaar |
| 6,588,250 | B2 | 7/2003 | Schell |
| 6,622,993 | B2 | 9/2003 | Mulvaney |
| 6,691,526 | B2 | 2/2004 | Gether et al. |
| 6,698,219 | B2 | 3/2004 | Sekhar et al. |
| 6,711,470 | B1 | 3/2004 | Hartenstein et al. |
| 6,752,713 | B2 | 6/2004 | Johnson, Jr. |
| 6,790,136 | B2 | 9/2004 | Sharp et al. |
| 6,826,920 | B2 | 12/2004 | Wacker |
| 6,843,068 | B1 | 1/2005 | Wacker |
| 6,848,266 | B1 | 2/2005 | Sheehan |
| 6,884,399 | B2 | 4/2005 | Reisfeld et al. |
| 6,898,960 | B1 | 5/2005 | Bodnar |
| 6,902,592 | B2 | 6/2005 | Green et al. |
| 6,916,239 | B2 | 7/2005 | Siddaramanna et al. |
| 6,919,809 | B2 | 7/2005 | Blunn et al. |
| 6,920,874 | B1 | 7/2005 | Siegel |
| 6,924,326 | B2 | 8/2005 | Meyer et al. |
| 6,926,079 | B2 | 8/2005 | Kensok et al. |
| 6,941,193 | B2 | 9/2005 | Frecska et al. |
| 6,952,715 | B1 | 10/2005 | Kronz |
| 7,016,791 | B2 | 3/2006 | Carnegie et al. |
| 7,048,776 | B2 | 5/2006 | Moore et al. |
| 7,059,400 | B2 | 6/2006 | Sekhar et al. |
| 7,114,343 | B2 | 10/2006 | Kates |
| 7,151,264 | B2 | 12/2006 | Ehlers, Sr. |
| 7,178,350 | B2 | 2/2007 | Shah |
| 7,186,290 | B2 | 3/2007 | Sheehan et al. |
| 7,222,494 | B2 | 5/2007 | Peterson et al. |
| 7,241,326 | B2 | 7/2007 | Han et al. |
| 7,253,743 | B2 | 8/2007 | Liang et al. |
| 7,255,831 | B2 | 8/2007 | Wei et al. |
| 7,261,762 | B2 | 8/2007 | Kang et al. |
| 7,266,960 | B2 | 9/2007 | Shah |
| 7,267,017 | B1 | 9/2007 | Bodnar |
| RE39,871 | E | 10/2007 | Skardon |
| 7,291,206 | B1 | 11/2007 | Kiern et al. |
| 7,291,315 | B2 | 11/2007 | Obee et al. |
| 7,302,313 | B2 | 11/2007 | Sharp et al. |
| 7,306,650 | B2 | 12/2007 | Slayzak et al. |
| 7,325,748 | B2 | 2/2008 | Acker, Jr. |
| 7,326,388 | B2 | 2/2008 | Uslenghi et al. |
| 7,357,828 | B2 | 4/2008 | Bohlen |
| 7,366,588 | B2 | 4/2008 | Kim et al. |
| 7,368,003 | B2 | 5/2008 | Crapser et al. |
| 7,369,955 | B2 | 5/2008 | Lee |
| 7,378,064 | B2 | 5/2008 | Uslenghi et al. |
| 7,381,244 | B2 | 6/2008 | Tyndall et al. |
| 7,389,158 | B2 | 6/2008 | Desrochers et al. |
| 7,398,821 | B2 | 7/2008 | Rainer et al. |
| 7,407,624 | B2 | 8/2008 | Cumberland et al. |
| 7,413,594 | B2 | 8/2008 | Paterson et al. |
| 7,434,413 | B2 | 10/2008 | Wruck |
| 7,475,828 | B2 | 1/2009 | Bartlett et al. |
| 7,552,030 | B2 | 6/2009 | Guralnik et al. |
| 7,552,635 | B2 | 6/2009 | Chang et al. |
| 7,574,871 | B2 | 8/2009 | Bloemer et al. |
| 7,621,985 | B1 | 11/2009 | Kuo |
| 7,632,178 | B2 | 12/2009 | Meneely, Jr. |
| 7,632,340 | B2 | 12/2009 | Brady et al. |
| 7,635,845 | B2 | 12/2009 | Jensen et al. |
| 7,645,323 | B2 | 1/2010 | Massenbauer-Strafe et al. |
| 7,651,256 | B2 | 1/2010 | Lee et al. |
| 7,721,560 | B2 | 5/2010 | Carpenter |
| 7,740,184 | B2 | 6/2010 | Schnell et al. |
| 7,748,639 | B2 | 7/2010 | Perry |
| 7,758,408 | B2 | 7/2010 | Hagentoft |
| 7,765,792 | B2 | 8/2010 | Rhodes et al. |
| 7,780,092 | B2 | 8/2010 | Ahmed |
| 7,789,951 | B2 | 9/2010 | Sung et al. |
| 7,809,472 | B1 | 10/2010 | Silva et al. |
| 7,811,363 | B2 | 10/2010 | Zhang |
| 7,836,712 | B2 | 11/2010 | Sasao et al. |
| 7,837,958 | B2 | 11/2010 | Crapser et al. |
| 7,839,275 | B2 | 11/2010 | Spalink et al. |
| 7,857,884 | B2 | 12/2010 | Bohlen |
| 7,857,890 | B2 | 12/2010 | Paterson et al. |
| 7,918,407 | B2 | 4/2011 | Patch |
| 7,932,490 | B2 | 4/2011 | Wang et al. |

(56) References Cited

U.S. PATENT DOCUMENTS

| | | |
|---|---|---|
| 7,938,896 B2 | 5/2011 | Paterson et al. |
| 7,951,327 B2 | 5/2011 | Reisfeld et al. |
| 7,966,104 B2 | 6/2011 | Srivastava et al. |
| 7,979,163 B2 | 7/2011 | Terlson et al. |
| 8,024,982 B2 | 9/2011 | Pettit et al. |
| 8,024,986 B2 | 9/2011 | Pettit et al. |
| 8,066,558 B2 | 11/2011 | Thomle et al. |
| 8,079,575 B2 | 12/2011 | Novotny et al. |
| 8,083,398 B2 | 12/2011 | Doll |
| 8,086,407 B2 | 12/2011 | Chan et al. |
| 8,097,067 B2 | 1/2012 | Fox et al. |
| 8,118,236 B2 | 2/2012 | Lestage et al. |
| 8,147,302 B2 | 4/2012 | Desrochers et al. |
| 8,172,154 B1 | 5/2012 | Figley et al. |
| 8,190,367 B2 | 5/2012 | Bassa |
| 8,219,249 B2 | 7/2012 | Harrod et al. |
| 8,231,112 B2 | 7/2012 | Cao et al. |
| 8,231,716 B2 | 7/2012 | Poon |
| 8,239,066 B2 | 8/2012 | Jennings et al. |
| 8,267,164 B2 | 9/2012 | Lestage et al. |
| 8,292,270 B2 | 10/2012 | Terlson et al. |
| 8,318,084 B2 | 11/2012 | Johnson et al. |
| 8,328,910 B2 | 12/2012 | Mulholland |
| 8,333,816 B2 | 12/2012 | Kummer et al. |
| 8,335,593 B2 | 12/2012 | Johnson et al. |
| 8,347,643 B2 | 1/2013 | Taras et al. |
| 8,392,025 B2 | 3/2013 | Orfield |
| 8,397,522 B2 | 3/2013 | Springer et al. |
| 8,398,917 B2 | 3/2013 | Itzhak et al. |
| 8,398,923 B2 | 3/2013 | Mole |
| 8,402,815 B2 | 3/2013 | Marra |
| 8,423,192 B2 | 4/2013 | Liu |
| 8,428,901 B2 | 4/2013 | Hsieh |
| 8,442,694 B2 | 5/2013 | Jang |
| 8,467,977 B2 | 6/2013 | Xia et al. |
| 8,473,429 B2 | 6/2013 | Cheng et al. |
| 8,479,560 B2 | 7/2013 | Cobianu et al. |
| 8,492,722 B2 | 7/2013 | Chang et al. |
| 8,496,514 B2 | 7/2013 | Kim et al. |
| 8,496,735 B2 | 7/2013 | Jones et al. |
| 8,529,830 B2 | 9/2013 | Zhou et al. |
| 8,544,288 B2 | 10/2013 | MacDonald |
| 8,554,375 B2 | 10/2013 | Nerling |
| 8,555,662 B2 | 10/2013 | Peterson et al. |
| 8,560,126 B2 | 10/2013 | Vass et al. |
| 8,567,204 B2 | 10/2013 | Seem |
| 8,574,343 B2 | 11/2013 | Bisson et al. |
| 8,615,327 B2 | 12/2013 | Takagi et al. |
| 8,640,970 B2 | 2/2014 | Dorendorf |
| 8,651,391 B2 | 2/2014 | Patch |
| 8,683,845 B2 | 4/2014 | Fleischer et al. |
| 8,689,572 B2 | 4/2014 | Evans et al. |
| 8,691,144 B2 | 4/2014 | Garfield et al. |
| 8,696,800 B2 | 4/2014 | Storm |
| 8,700,227 B2 | 4/2014 | Vass et al. |
| 8,726,721 B2 | 5/2014 | Minges |
| 8,734,565 B2 | 5/2014 | Hoglund et al. |
| 8,744,629 B2 | 6/2014 | Wallaert et al. |
| 8,755,942 B2 | 6/2014 | Bonilla et al. |
| 8,757,154 B2 | 6/2014 | Schuller |
| 8,758,262 B2 | 6/2014 | Rhee et al. |
| 8,761,945 B2 | 6/2014 | Hadzidedic |
| 8,768,521 B2 | 7/2014 | Amundson et al. |
| 8,797,159 B2 | 8/2014 | Kirkpatrick et al. |
| 8,813,583 B2 | 8/2014 | Klips et al. |
| 8,838,037 B2 | 9/2014 | Niederberger et al. |
| 8,852,501 B2 | 10/2014 | Hedman |
| 8,860,569 B2 | 10/2014 | Hruska et al. |
| 8,880,224 B2 | 11/2014 | Eaton et al. |
| 8,883,083 B2 | 11/2014 | Law et al. |
| 8,886,785 B2 | 11/2014 | Apte et al. |
| 8,889,079 B2 | 11/2014 | Zahedi |
| 8,892,797 B2 | 11/2014 | Grohman |
| 8,899,055 B2 | 12/2014 | Kuenzel et al. |
| 8,900,518 B2 | 12/2014 | Seck |
| 8,907,803 B2 | 12/2014 | Martin |
| 8,920,537 B2 | 12/2014 | Seike |
| 8,922,971 B2 | 12/2014 | Abate et al. |
| 8,930,030 B2 | 1/2015 | Bester et al. |
| 8,955,761 B2 | 2/2015 | Malloy |
| 8,958,918 B2 | 2/2015 | Voysey |
| 8,961,881 B2 | 2/2015 | Hagh et al. |
| 8,963,728 B2 | 2/2015 | Kates |
| 8,973,845 B2 | 3/2015 | Kanaya et al. |
| 8,978,445 B2 | 3/2015 | Bergsten |
| 8,986,427 B2 | 3/2015 | Hauville |
| 9,010,172 B2 | 4/2015 | Xia et al. |
| 9,019,111 B1 | 4/2015 | Sloo et al. |
| 9,023,304 B2 | 5/2015 | Nikles |
| 9,040,007 B2 | 5/2015 | Hui et al. |
| 9,040,008 B2 | 5/2015 | Zahedi |
| 9,061,230 B2 | 6/2015 | Barakat |
| 9,073,009 B2 | 7/2015 | Vanderspurt et al. |
| 9,078,082 B2 | 7/2015 | Gill et al. |
| 9,080,784 B2 | 7/2015 | Dean-Hendricks et al. |
| 9,091,497 B2 | 7/2015 | Schwendinger et al. |
| 9,092,040 B2 | 7/2015 | Fadell et al. |
| 9,095,636 B2 | 8/2015 | Schmidt et al. |
| 9,097,432 B2 | 8/2015 | Kreft et al. |
| 9,101,904 B2 | 8/2015 | Yates et al. |
| 9,103,557 B2 | 8/2015 | Choi et al. |
| 9,109,981 B2 | 8/2015 | Sharp |
| 9,109,989 B2 | 8/2015 | Hamann et al. |
| 9,121,618 B2 | 9/2015 | Fisher et al. |
| 9,121,837 B2 | 9/2015 | Chan et al. |
| 9,143,344 B2 | 9/2015 | Cho et al. |
| 9,157,647 B2 | 10/2015 | Leen et al. |
| 9,164,519 B2 | 10/2015 | Holloway |
| 9,166,992 B1 | 10/2015 | Stickle et al. |
| 9,175,872 B2 | 11/2015 | McKie et al. |
| 9,182,751 B1 | 11/2015 | Reeder |
| 9,186,609 B2 | 11/2015 | Sherman, III et al. |
| 9,200,804 B2 | 12/2015 | Park et al. |
| 9,208,676 B2 | 12/2015 | Fadell et al. |
| 9,233,472 B2 | 1/2016 | Angle et al. |
| 9,234,667 B2 | 1/2016 | Ito et al. |
| 9,250,633 B2 | 2/2016 | Chen et al. |
| 9,254,459 B2 | 2/2016 | Miller |
| 9,261,290 B2 | 2/2016 | Storm |
| 9,278,304 B2 | 3/2016 | Lee |
| 9,280,884 B1 | 3/2016 | Schultz et al. |
| 9,286,779 B2 | 3/2016 | Shaw et al. |
| 9,304,511 B2 | 4/2016 | Blount et al. |
| 9,304,521 B2 | 4/2016 | Kates |
| 9,308,492 B2 | 4/2016 | Obee et al. |
| 9,310,088 B2 | 4/2016 | Melikov et al. |
| 9,311,807 B2 | 4/2016 | Schultz et al. |
| 9,316,410 B2 | 4/2016 | Meirav et al. |
| 9,317,659 B2 | 4/2016 | Balinski et al. |
| 9,323,895 B2 | 4/2016 | Balinski et al. |
| 9,325,516 B2 | 4/2016 | Pera et al. |
| 9,328,936 B2 | 5/2016 | Meirav et al. |
| 9,332,322 B2 | 5/2016 | Niemeyer et al. |
| 9,344,753 B2 | 5/2016 | Yerli |
| 9,347,678 B2 | 5/2016 | Stakutis et al. |
| 9,347,860 B1 | 5/2016 | Lalain et al. |
| 9,347,925 B2 | 5/2016 | Shen et al. |
| 9,353,964 B2 | 5/2016 | Kates |
| 9,353,966 B2 | 5/2016 | Finkam |
| 9,360,229 B2 | 6/2016 | Modi et al. |
| 9,366,448 B2 | 6/2016 | Dean-Hendricks et al. |
| 9,372,010 B2 | 6/2016 | Jung et al. |
| 9,375,672 B2 | 6/2016 | Meirav et al. |
| 9,375,847 B2 | 6/2016 | Angle et al. |
| 9,377,768 B2 | 6/2016 | Grohman |
| 9,390,388 B2 | 7/2016 | Drees et al. |
| 9,395,096 B2 | 7/2016 | Fisher et al. |
| 9,399,187 B2 | 7/2016 | Meirav et al. |
| 9,400,119 B2 | 7/2016 | Malloy |
| 9,404,666 B2 | 8/2016 | Terlson et al. |
| 9,405,301 B2 | 8/2016 | Montero et al. |
| 9,410,752 B2 | 8/2016 | Wallace |
| 9,416,987 B2 | 8/2016 | Ragland et al. |
| 9,417,005 B1 | 8/2016 | Roth et al. |

(56) References Cited

U.S. PATENT DOCUMENTS

| | | | |
|---|---|---|---|
| 9,417,637 B2 | 8/2016 | Matsuoka et al. |
| 9,423,144 B2 | 8/2016 | Evans et al. |
| 9,423,146 B2 | 8/2016 | Bruce et al. |
| 9,427,728 B2 | 8/2016 | Sidheswaran et al. |
| 9,449,491 B2 | 9/2016 | Sager et al. |
| 9,459,606 B2 | 10/2016 | Takayama et al. |
| 9,463,339 B2 | 10/2016 | Nozaki |
| 9,464,818 B2 | 10/2016 | Holm et al. |
| 9,498,555 B2 | 11/2016 | Hingorani et al. |
| 9,520,250 B2 | 12/2016 | O'Keeffe |
| 9,522,210 B2 | 12/2016 | Worrilow |
| 9,523,665 B2 | 12/2016 | Fleischer et al. |
| 9,535,407 B2 | 1/2017 | Durham et al. |
| 9,537,670 B2 | 1/2017 | Cho et al. |
| 9,557,069 B2 | 1/2017 | Matsui et al. |
| 9,568,445 B2 | 2/2017 | Klein et al. |
| 9,593,859 B2 | 3/2017 | Niazi |
| 9,593,861 B1 | 3/2017 | Burnett |
| 9,597,627 B2 | 3/2017 | Zhang |
| 9,599,353 B2 | 3/2017 | Cur et al. |
| 9,599,357 B2 | 3/2017 | Vogel |
| 9,612,188 B2 | 4/2017 | Johnston et al. |
| 9,618,224 B2 | 4/2017 | Emmons et al. |
| 9,638,434 B2 | 5/2017 | Alston |
| 9,638,436 B2 | 5/2017 | Arensmeier et al. |
| 9,643,117 B2 | 5/2017 | Rahlin et al. |
| 9,645,112 B2 | 5/2017 | Chan |
| 9,677,777 B2 | 6/2017 | Karamanos et al. |
| 9,694,309 B2 | 7/2017 | Weatherman et al. |
| 9,696,049 B2 | 7/2017 | Metteer |
| 9,696,735 B2 | 7/2017 | Matsuoka et al. |
| 9,709,291 B2 | 7/2017 | Dostmann |
| 9,714,844 B1 | 7/2017 | Stamatakis et al. |
| 9,715,242 B2 | 7/2017 | Pillai et al. |
| 9,723,380 B2 | 8/2017 | Patel et al. |
| 9,726,579 B2 | 8/2017 | Han et al. |
| 9,729,945 B2 | 8/2017 | Schultz et al. |
| 9,737,842 B2 | 8/2017 | Matlin et al. |
| 9,752,789 B2 | 9/2017 | Staniforth et al. |
| 9,759,437 B2 | 9/2017 | Kim et al. |
| 9,789,436 B2 | 10/2017 | Meirav et al. |
| 9,797,620 B2 | 10/2017 | Matsugi et al. |
| 9,797,812 B2 | 10/2017 | Hamann et al. |
| 9,802,322 B2 | 10/2017 | Angle et al. |
| 9,803,877 B2 | 10/2017 | Yun |
| 9,810,441 B2 | 11/2017 | Dean-Hendricks et al. |
| 9,816,724 B2 | 11/2017 | Phannavong et al. |
| 9,821,260 B2 | 11/2017 | Stoner, Jr. et al. |
| 9,833,734 B2 | 12/2017 | Fox et al. |
| 9,835,348 B2 | 12/2017 | Storm et al. |
| 9,839,872 B2 | 12/2017 | Spartz |
| 9,851,299 B2 | 12/2017 | Bertaux |
| 9,854,335 B2 | 12/2017 | Patel et al. |
| 9,856,883 B1 | 1/2018 | Olsen |
| 9,857,301 B1 | 1/2018 | Nourbakhsh et al. |
| 9,874,873 B2 | 1/2018 | Angle et al. |
| 9,890,969 B2 | 2/2018 | Martin |
| 9,986,313 B2 | 5/2018 | Schwarzkopf et al. |
| 9,990,842 B2 | 6/2018 | Zribi et al. |
| 2003/0070544 A1 | 4/2003 | Mulvaney et al. |
| 2005/0098495 A1 | 5/2005 | Hughes |
| 2005/0277381 A1 | 12/2005 | Banerjee et al. |
| 2006/0055547 A1 | 3/2006 | DiMaggio |
| 2006/0267756 A1 | 11/2006 | Kates |
| 2007/0013534 A1 | 1/2007 | DiMaggio |
| 2007/0082601 A1 | 4/2007 | Desrochers et al. |
| 2007/0155305 A1 | 7/2007 | Heidel et al. |
| 2008/0014857 A1 | 1/2008 | Spadafora et al. |
| 2008/0022705 A1 | 1/2008 | Clearman |
| 2008/0078842 A1 | 4/2008 | MacDonald |
| 2008/0182506 A1 | 7/2008 | Jackson et al. |
| 2008/0315000 A1 | 12/2008 | Gorthala et al. |
| 2009/0079098 A1 | 3/2009 | Ezra |
| 2009/0126382 A1 | 5/2009 | Rubino et al. |
| 2009/0179338 A1 | 7/2009 | Cottier |
| 2009/0204262 A1 | 8/2009 | Nishimura |
| 2010/0241287 A1 | 9/2010 | Nishino et al. |
| 2011/0010071 A1 | 1/2011 | Rhodes et al. |
| 2011/0125044 A1 | 5/2011 | Rhee et al. |
| 2011/0151766 A1 | 6/2011 | Sherman et al. |
| 2011/0184250 A1 | 7/2011 | Schmidt et al. |
| 2012/0095684 A1 | 4/2012 | Chan et al. |
| 2012/0150333 A1* | 6/2012 | De Luca ............ G06K 9/00281 700/109 |
| 2012/0323374 A1 | 12/2012 | Dean-Hendricks et al. |
| 2013/0014522 A1 | 1/2013 | Lukasse et al. |
| 2013/0144527 A1 | 6/2013 | Kuhnreichi |
| 2013/0174841 A1 | 7/2013 | McAuley et al. |
| 2013/0184875 A1 | 7/2013 | Miura |
| 2013/0226352 A1 | 8/2013 | Dean-Hendricks et al. |
| 2013/0287626 A1 | 10/2013 | Benedek et al. |
| 2013/0289778 A1 | 10/2013 | Ishizaka |
| 2013/0323781 A1 | 12/2013 | Moularat et al. |
| 2013/0344609 A1 | 12/2013 | Mayer et al. |
| 2014/0020559 A1 | 1/2014 | Meirav et al. |
| 2014/0053586 A1 | 2/2014 | Poecher et al. |
| 2014/0079564 A1 | 3/2014 | Becerra et al. |
| 2014/0083292 A1 | 3/2014 | Weiden |
| 2014/0109649 A1 | 4/2014 | Fleischer et al. |
| 2014/0129004 A1 | 5/2014 | Takayama et al. |
| 2014/0139342 A1 | 5/2014 | Brown |
| 2014/0190679 A1 | 7/2014 | Roosli et al. |
| 2014/0207693 A1 | 7/2014 | Horst et al. |
| 2014/0217185 A1 | 8/2014 | Bicknell |
| 2014/0244043 A1 | 8/2014 | Foster |
| 2014/0262837 A1 | 9/2014 | Sidheswaran et al. |
| 2014/0266755 A1 | 9/2014 | Arensmeier et al. |
| 2014/0313048 A1 | 10/2014 | Sabata et al. |
| 2014/0346237 A1 | 11/2014 | Mirza et al. |
| 2014/0354976 A1 | 12/2014 | Evenstad et al. |
| 2014/0365017 A1 | 12/2014 | Hanna et al. |
| 2014/0370800 A1 | 12/2014 | Ansari |
| 2015/0011154 A1 | 1/2015 | Holm et al. |
| 2015/0032264 A1 | 1/2015 | Emmons et al. |
| 2015/0046179 A1 | 2/2015 | Kang |
| 2015/0050876 A1 | 2/2015 | Sakai et al. |
| 2015/0052975 A1 | 2/2015 | Martin |
| 2015/0077737 A1 | 3/2015 | Belinsky et al. |
| 2015/0088786 A1 | 3/2015 | Anandhakrishnan |
| 2015/0140919 A1 | 5/2015 | Zwijack |
| 2015/0153061 A1 | 6/2015 | Riberon et al. |
| 2015/0153317 A1 | 6/2015 | Krebs |
| 2015/0168003 A1 | 6/2015 | Stefanski et al. |
| 2015/0168964 A1 | 6/2015 | Wu et al. |
| 2015/0194039 A1 | 7/2015 | Martin |
| 2015/0202563 A1 | 7/2015 | Spartz |
| 2015/0241318 A1 | 8/2015 | Hamann et al. |
| 2015/0246150 A1 | 9/2015 | De Koster et al. |
| 2015/0256355 A1 | 9/2015 | Pera et al. |
| 2015/0285524 A1 | 10/2015 | Saunders |
| 2015/0285755 A1 | 10/2015 | Moss et al. |
| 2015/0289802 A1 | 10/2015 | Thomas et al. |
| 2015/0298043 A1 | 10/2015 | Meirav et al. |
| 2015/0301513 A1 | 10/2015 | Sager et al. |
| 2015/0306271 A1 | 10/2015 | Willette |
| 2015/0323206 A1 | 11/2015 | Chan et al. |
| 2015/0323427 A1 | 11/2015 | Sharp |
| 2015/0323941 A1 | 11/2015 | Pariseau et al. |
| 2015/0330650 A1 | 11/2015 | Abiprojo et al. |
| 2015/0330817 A1 | 11/2015 | Law et al. |
| 2015/0335834 A1 | 11/2015 | Anandhakrishnan |
| 2015/0347910 A1 | 12/2015 | Fadell et al. |
| 2015/0348400 A1 | 12/2015 | Zribi et al. |
| 2015/0354848 A1 | 12/2015 | Abel et al. |
| 2015/0369503 A1 | 12/2015 | Flaherty et al. |
| 2015/0369507 A1 | 12/2015 | Flaherty et al. |
| 2015/0370986 A1 | 12/2015 | Hayward |
| 2015/0375187 A1 | 12/2015 | Yates et al. |
| 2016/0015277 A1 | 1/2016 | Dumoulin et al. |
| 2016/0015278 A1 | 1/2016 | Campo et al. |
| 2016/0015314 A1 | 1/2016 | Dusanter et al. |
| 2016/0015315 A1 | 1/2016 | Auphan et al. |
| 2016/0026201 A1 | 1/2016 | Vellanki et al. |
| 2016/0029805 A1 | 2/2016 | Arens et al. |

(56) References Cited

U.S. PATENT DOCUMENTS

| | | |
|---|---|---|
| 2016/0041074 A1 | 2/2016 | Pliskin |
| 2016/0048143 A1 | 2/2016 | Chan et al. |
| 2016/0054018 A1 | 2/2016 | Motodani et al. |
| 2016/0054023 A1 | 2/2016 | Baker et al. |
| 2016/0061472 A1 | 3/2016 | Lee et al. |
| 2016/0061794 A1 | 3/2016 | Schultz et al. |
| 2016/0078751 A1 | 3/2016 | Sloo et al. |
| 2016/0088438 A1 | 3/2016 | O'Keeffe |
| 2016/0089089 A1 | 3/2016 | Kakkar et al. |
| 2016/0091216 A1 | 3/2016 | Tran et al. |
| 2016/0107114 A1 | 4/2016 | Fu et al. |
| 2016/0110782 A1 | 4/2016 | Tadajewski |
| 2016/0116181 A1 | 4/2016 | Aultman et al. |
| 2016/0125714 A1 | 5/2016 | Kates et al. |
| 2016/0132031 A1 | 5/2016 | Kozura et al. |
| 2016/0133108 A1 | 5/2016 | Bucsa et al. |
| 2016/0139038 A1 | 5/2016 | Oldsen et al. |
| 2016/0147506 A1 | 5/2016 | Britt et al. |
| 2016/0153674 A1 | 6/2016 | Lancaster |
| 2016/0153884 A1 | 6/2016 | Han et al. |
| 2016/0161137 A1 | 6/2016 | Chen et al. |
| 2016/0169544 A1 | 6/2016 | Fischer et al. |
| 2016/0169545 A1 | 6/2016 | Mangsuli et al. |
| 2016/0178586 A1 | 6/2016 | Stark |
| 2016/0209065 A1 | 7/2016 | Hagstrom et al. |
| 2016/0209070 A1 | 7/2016 | Hrejsa et al. |
| 2016/0209316 A1 | 7/2016 | Buseyne et al. |
| 2016/0228809 A1 | 8/2016 | Meirav et al. |
| 2016/0228811 A1 | 8/2016 | Meirav et al. |
| 2016/0231014 A1 | 8/2016 | Ro et al. |
| 2016/0238527 A1 | 8/2016 | Tseng et al. |
| 2016/0245784 A1 | 8/2016 | Matocha et al. |
| 2016/0256097 A1* | 9/2016 | Manautou ............... A61B 5/11 |
| 2016/0256590 A1 | 9/2016 | Taghipour |
| 2016/0263263 A1 | 9/2016 | Robert |
| 2016/0263268 A1 | 9/2016 | Kirschman |
| 2016/0267776 A1 | 9/2016 | Martin |
| 2016/0292781 A1 | 10/2016 | Nahmad et al. |
| 2016/0313290 A1 | 10/2016 | Forzani et al. |
| 2016/0332170 A1 | 11/2016 | Wennerstrom |
| 2016/0334121 A1 | 11/2016 | Oobayashi |
| 2016/0348938 A1 | 12/2016 | Simon et al. |
| 2016/0356511 A1 | 12/2016 | Messinger et al. |
| 2016/0363332 A1 | 12/2016 | Blackley |
| 2016/0363339 A1 | 12/2016 | Blackley |
| 2016/0370021 A1 | 12/2016 | Wiley et al. |
| 2016/0370029 A1 | 12/2016 | Kurelowech |
| 2016/0377305 A1 | 12/2016 | Kwa |
| 2017/0007954 A1 | 1/2017 | Ehdaie |
| 2017/0010006 A1 | 1/2017 | Kim et al. |
| 2017/0021298 A1 | 1/2017 | Williams et al. |
| 2017/0080373 A1 | 3/2017 | Engelhard |
| 2017/0089810 A1 | 3/2017 | Novaro |
| 2017/0095762 A1 | 4/2017 | Wolowicz |
| 2017/0097165 A1 | 4/2017 | Yasuda et al. |
| 2017/0098230 A1 | 4/2017 | Orangkhadivi |
| 2017/0103633 A1 | 4/2017 | Khire et al. |
| 2017/0108231 A1 | 4/2017 | Hasegawa et al. |
| 2017/0130981 A1 | 5/2017 | Willette et al. |
| 2017/0159964 A1 | 6/2017 | Arai et al. |
| 2017/0167743 A1 | 6/2017 | Dempsey et al. |
| 2017/0189844 A1 | 7/2017 | McLeod et al. |
| 2017/0193788 A1 | 7/2017 | Kim et al. |
| 2017/0193792 A1 | 7/2017 | Bermudez Rodriguez et al. |
| 2017/0234570 A1 | 8/2017 | Livchak et al. |
| 2017/0248332 A1 | 8/2017 | Wright et al. |
| 2017/0268797 A1 | 9/2017 | Mowris et al. |
| 2017/0273256 A1 | 9/2017 | Hutzel |
| 2017/0273845 A1 | 9/2017 | Phillips et al. |
| 2017/0314812 A1 | 11/2017 | Hurley |
| 2017/0323550 A1 | 11/2017 | Patil et al. |
| 2017/0328591 A1 | 11/2017 | Kelly et al. |
| 2017/0333838 A1 | 11/2017 | Bender et al. |
| 2017/0341001 A1 | 11/2017 | Jousma et al. |
| 2017/0341002 A1 | 11/2017 | Cama et al. |
| 2017/0343227 A1 | 11/2017 | Mowris |
| 2017/0347499 A1 | 11/2017 | Ross et al. |
| 2017/0350610 A1 | 12/2017 | Michielsen et al. |
| 2017/0350611 A1 | 12/2017 | Su et al. |
| 2017/0356670 A1 | 12/2017 | Zhang et al. |
| 2017/0368488 A1 | 12/2017 | Wall |
| 2018/0001249 A1 | 1/2018 | Sher |
| 2018/0017275 A1 | 1/2018 | Merrill |
| 2018/0017278 A1 | 1/2018 | Klein et al. |
| 2018/0017513 A1 | 1/2018 | Le Neel et al. |
| 2018/0017536 A1 | 1/2018 | Le Neel et al. |
| 2018/0021613 A1 | 1/2018 | Li |
| 2018/0023831 A1 | 1/2018 | Ha et al. |
| 2018/0023834 A1 | 1/2018 | Hatch et al. |
| 2018/0073759 A1 | 3/2018 | Zhang et al. |
| 2018/0119973 A1 | 5/2018 | Rothman et al. |
| 2018/0119974 A1 | 5/2018 | Kotake et al. |
| 2018/0135877 A1 | 5/2018 | Seiler |
| 2018/0148180 A1 | 5/2018 | Fagundes et al. |
| 2018/0304472 A1 | 10/2018 | Angle et al. |
| 2018/0350226 A1 | 12/2018 | Martin |
| 2019/0097827 A1 | 3/2019 | Angle et al. |
| 2019/0178522 A1 | 6/2019 | Sun et al. |

FOREIGN PATENT DOCUMENTS

| | | |
|---|---|---|
| CN | 102393882 A | 3/2012 |
| CN | 202792383 U | 3/2013 |
| CN | 203090662 U | 7/2013 |
| CN | 104089361 A | 10/2014 |
| CN | 203949322 U | 11/2014 |
| CN | 104359815 A | 2/2015 |
| CN | 104534617 A | 4/2015 |
| CN | 103958976 B | 11/2016 |
| CN | 106196506 A | 12/2016 |
| CN | 107676931 A | 2/2018 |
| CN | 107940682 A | 4/2018 |
| DE | 10108274 A1 | 9/2002 |
| EP | 0893657 A1 | 1/1999 |
| EP | 1402935 A1 | 3/2004 |
| EP | 1904905 A2 | 4/2008 |
| EP | 2450640 A2 | 5/2012 |
| EP | 2134556 B1 | 7/2012 |
| EP | 2368616 B1 | 12/2012 |
| EP | 2564114 A1 | 3/2013 |
| EP | 2713159 A2 | 4/2014 |
| EP | 2891019 A1 | 7/2015 |
| EP | 2937961 A1 | 10/2015 |
| EP | 3040948 A1 | 7/2016 |
| EP | 3073883 A1 | 10/2016 |
| EP | 3121524 A1 | 1/2017 |
| JP | H05180487 A | 7/1993 |
| JP | 2007083106 A | 4/2007 |
| JP | 2007120815 A | 5/2007 |
| JP | 2011146137 A | 7/2011 |
| JP | 5231476 B2 | 7/2013 |
| JP | 2014208343 A | 11/2014 |
| JP | 2015114014 A | 6/2015 |
| JP | 2015152175 A | 8/2015 |
| JP | 2018017403 A | 2/2018 |
| KR | 100182648 | 5/1999 |
| KR | 20000007498 A | 2/2000 |
| KR | 100355352 B1 | 9/2002 |
| KR | 20030016787 A | 3/2003 |
| KR | 100509332 B1 | 8/2005 |
| KR | 100721458 B1 | 5/2007 |
| KR | 20070072787 A | 7/2007 |
| KR | 100782175 B1 | 12/2007 |
| KR | 100819077 B1 | 4/2008 |
| KR | 100930346 B1 | 12/2009 |
| KR | 20100089605 A | 8/2010 |
| KR | 101013372 B1 | 2/2011 |
| KR | 20110074222 A | 6/2011 |
| KR | 20110093329 A | 8/2011 |
| KR | 10-1492316 B1 | 2/2015 |
| KR | 101566592 B1 | 11/2015 |
| KR | 101765454 B1 | 8/2017 |
| KR | 101771053 B1 | 8/2017 |
| KR | 20170122043 A | 11/2017 |

(56) References Cited

FOREIGN PATENT DOCUMENTS

| KR | 20180007381 A | 1/2018 |
|---|---|---|
| LU | 92350 A1 | 7/2015 |
| WO | WO-9409324 A1 | 4/1994 |
| WO | WO-2005110580 A2 | 11/2005 |
| WO | WO-2013163612 A1 | 10/2013 |
| WO | WO-2015078672 A1 | 6/2015 |
| WO | WO-2016102337 A1 | 6/2016 |
| WO | WO-2016139544 A1 | 9/2016 |
| WO | WO-2017146637 A1 | 8/2017 |
| WO | WO-2017157987 A1 | 9/2017 |

OTHER PUBLICATIONS

"Home Comfort: Digital, App-Based Climate Control", Ecovent Systems Inc., <https://www.ecoventsystems.com/> 2018.
"Meet the Keen Home Zoning System- How It Works", Keen Home, Inc., <https://keenhome.io/pages/how-it-works> 2018.
Doty, Steve, et al., "Building Operations: Balancing Energy Efficiency with Indoor Air Quality", 2009.
El Mankibi, Mohamed, "Indoor air quality control in case of scheduled or intermittent occupancy based building: Development of a scale model", 2009.
Emmerich, Steven, et al., "Indoor air quality impacts of residential HVAC systems, phase 1 report: Computer simulation plan", NISTIR 5346: Building and Fire Research Laboratory; National Institute of Standards and Technology: http://www.researchgate.net/profile/Steven_Emmerich/publication/236454476_Indoor_air_quality_impacts_of_residential_HVAC_systems_phase_1_report_Computer_simulation_plan/links/565f5f2308ae1ef929854780.pdf; Feb. 1994; 108 Pages.
Footbot; Product Specifications; www.footbot.io. Accessed Sep. 13, 2017.
Herberger, Simone, et al., "Indoor Air Quality Monitoring Improving Air Quality Perception", 2012.
International Search Report of the ISA/KR regarding International Application No. PCT/US2018/062190 dated Mar. 21, 2019.
International Search Report of the ISA/KR regarding International Application No. PCT/US2019/028402 dated Aug. 7, 2019.
International Search Report of the ISA/KR regarding International Application No. PCT/US2019/028408 dated Aug. 9, 2019.
International Search Report of the ISA/KR regarding International Application No. PCT/US2019/028410 dated Aug. 7, 2019.
International Search Report regarding International Application No. PCT/US2019/028391 dated Aug. 14, 2019.
Notice of Allowance regarding U.S. Appl. No. 16/196,703 dated May 14, 2020.
Notice of Allowance regarding U.S. Appl. No. 16/196,744 dated Apr. 27, 2020.
Notice of Allowance regarding U.S. Appl. No. 16/196,744 dated Mar. 4, 2020.
Notice of Allowance regarding U.S. Appl. No. 16/196,770 dated May 5, 2020.
Notice of Allowance regarding Application No. 161/196,770 dated Mar. 3, 2020.
Shaw, C. Y., "Maintaining acceptable air quality in office buildings through ventilation", Construction Technology Updated No. 3, Institute for Research in Construction, National Research Council of Canada, Jan. 1997; 4 Pages.
Turner, William J.N., et al, "Energy and IAQ implications of residential ventilation cooling", ResearchGate: http://www.researchgate.net/profile/William_Turner10/publication/278961832_Energy_and_IAQ_implications_of_residential_ventilation_cooling/links/5587e12608aef58c03a06547.pdf, Aug. 2014; 52 pages.
Written Opinion of the ISA/KR regarding International Application No. PCT/US2018/062190 dated Mar. 21, 2019.
Written Opinion of the ISA/KR regarding International Application No. PCT/US2019/028391 dated Aug. 14, 2019.
Written Opinion of the ISA/KR regarding International Application No. PCT/US2019/028402 dated Aug. 7, 2019.
Written Opinion of the ISA/KR regarding International Application No. PCT/US2019/028408 dated Aug. 9, 2019.
Written Opinion of the ISA/KR regarding International Application No. PCT/US2019/028410 dated Aug. 7, 2019.
Zhong, Lexuan, et al., "Ozonation Air Purification Technology in HVAC Applications", Concordia University: http://www.researchgate.net/profile/Lexuan_Zhong/publication/260363850_Ozonation_Air_Purification_Technology_in_HVAC_Applications/links/0a85e530e28d98ecf4000000, 2014; 8 Pages.
U.S. Appl. No. 17/048,982, filed Oct. 19, 2020, Stuart K. Morgan.
U.S. Appl. No. 17/078,019, filed Oct. 22, 2020, Stuart K. Morgan.
U.S. Appl. No. 17/048,887, filed Oct. 19, 2020, Stuart K. Morgan.
U.S. Appl. No. 17/048,946, filed Oct. 19, 2020, Stuart K. Morgan.
U.S. Appl. No. 17/048,967, filed Oct. 19, 2020, Hung M. Pham.

* cited by examiner

INDOOR AIR QUALITY AND OCCUPANT MONITORING SYSTEMS AND METHODS

CROSS-REFERENCE TO RELATED APPLICATIONS

This application is the U.S. National Phase Application under 35 U.S.C. 371 of International Application No. PCT/US2019/028391, filed on Apr. 19, 2019, which claims the benefit of U.S. Provisional Application No. 62/660,346, filed on Apr. 20, 2018. The entire disclosures of the application applications referenced above are incorporated herein by reference.

FIELD

The present disclosure relates to environmental control systems and more particularly to systems and methods for monitoring indoor air quality and occupant conditions.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A residential or light commercial HVAC (heating, ventilation, and/or air conditioning) system controls temperature and humidity of a building. Upper and lower temperature limits may be specified by an occupant or owner of the building, such as an employee working in the building or a homeowner.

A thermostat controls operation of the HVAC system based on a comparison of the temperature at a thermostat and the target values. The thermostat may control the HVAC system to heat the building when the temperature is less than the lower temperature limit. The thermostat may control the HVAC system to cool the building when the temperature is greater than the upper temperature limit. Heating the building and cooling the building generally decreases humidity, although the HVAC system may include a humidifier that adds humidity to warm air output by the HVAC system during heating of the building.

SUMMARY

In a feature, an indoor air quality (IAQ) system for a building is described. The IAQ system includes at least one of: a temperature sensor configured to measure a temperature of air at the temperature sensor; a relative humidity (RH) sensor configured to measure a RH of air at the RH sensor; a particulate sensor configured to measure an amount of particulate of at least a predetermined size present in air at the particulate sensor; a volatile organic compound (VOC) sensor configured to measure an amount of VOCs present in air at the VOC sensor; and a carbon dioxide sensor configured to measure an amount of carbon dioxide present in air at the carbon dioxide sensor. The IAQ system also includes at least one of: a microphone; and a camera. The IAQ system also includes: a condition identification module configured to, based on output from the at least one of the microphone and the camera, indicate an occurrence of a user having a physical condition; and a correlation module configured to, based on the occurrence of the user having the physical condition and the at least one of the temperature, the RH, the amount of particulate, the amount of VOCs, and the amount of carbon dioxide, selectively identify the presence of a correlation between the occurrence of the user having the physical condition and the at least one of the temperature, the RH, the amount of particulate, the amount of VOCs, and the amount of carbon dioxide.

In further features, the condition identification module is configured to indicate the occurrence of the user at least one of coughing, wheezing, and sneezing based on a comparison the output from at least one of the microphone and the camera with predetermined output indicative of the at least one of coughing, wheezing, and sneezing.

In further features, the condition identification module is configured to indicate the occurrence of the user having watery eyes based on at least one of (a) receipt of user input indicative of the user having watery eyes and (b) a comparison of the output from the camera with predetermined output indicative of watery eyes.

In further features, the IAQ system further includes an IAQ sensor module including: the at least one of the temperature sensor, the RH sensor, the particulate sensor, the VOC sensor, and the carbon dioxide sensor; and at least one of the microphone and the camera.

In further features, the IAQ system further includes: an IAQ sensor module comprising the at least one of the temperature sensor, the RH sensor, the particulate sensor, the VOC sensor, and the carbon dioxide sensor, where at least one of the microphone and the camera is implemented separately from the IAQ sensor module.

In further features, the IAQ system further includes: a first transceiver configured to wirelessly transmit, via at least one antenna, the at least one of the temperature, the RH, the amount of particulate, the amount of VOCs, and the amount of carbon dioxide; and a second transceiver configured to wirelessly receive, from the first transceiver via at least one antenna, the at least one of the temperature, the RH, the amount of particulate, the amount of VOCs, and the amount of carbon dioxide, where the condition identification module receives the at least one of the temperature, the RH, the amount of particulate, the amount of VOCs, and the amount of carbon dioxide from the second transceiver.

In further features, the IAQ system further includes the correlation module is configured to selectively identify the presence of the correlation in response to the at least one of the temperature, the RH, the amount of particulate, the amount of VOCs, and the amount of carbon dioxide changing by at least a predetermined amount during a predetermined period before the occurrence of the user having the physical condition.

In further features, the IAQ system further includes the correlation module is configured to selectively identify the presence of the correlation in response to the at least one of the temperature, the RH, the amount of particulate, the amount of VOCs, and the amount of carbon dioxide being, within a predetermined period before the occurrence of the user having the physical condition, one of: greater than a predetermined value; and outside of a predetermined range.

In further features, the IAQ system further includes a computing device having a display, the computing device being configured to selectively display, on the display: the at least one of the RH, the amount of particulate, the amount of VOCs, and the amount of carbon dioxide over a period of time; and indicators of the occurrence of the user having the physical condition over the period of time.

In further features, the IAQ system further includes a mitigation module configured to selectively turn on and off at least one of a plurality of mitigation devices based on the at least one of the temperature, the RH, the amount of particulate, the amount of VOCs, and the amount of carbon dioxide.

In further features, the mitigation module is configured to: adjust a threshold value in response to the identification of the presence of the correlation; and turn on the at least one of the plurality of mitigation devices when the at least one of the temperature, the RH, the amount of particulate, the amount of VOCs, and the amount of carbon dioxide is greater than the threshold value.

In further features, the condition identification module configured to indicate an occurrence of a user having a physical condition in response to receipt of user input indicative of the user having the physical condition from a user computing device executing an application.

In a feature, a method includes: at least one of: by a temperature sensor within a building, measuring a temperature of air at the temperature sensor within a building; by a relative humidity (RH) sensor within the building, measuring a RH of the air at the RH sensor; by a particulate sensor within the building, measuring an amount of particulate of at least a predetermined size present in the air at the particulate sensor; by a volatile organic compound (VOC) sensor within the building, measuring an amount of VOCs present in the air at the VOC sensor; and by a carbon dioxide sensor within the building, measuring an amount of carbon dioxide present in the air at the carbon dioxide sensor; based on output from at least one of a microphone and a camera, indicating an occurrence of a user having a physical condition; and based on the occurrence of the user having the physical condition and the at least one of the temperature, the RH, the amount of particulate, the amount of VOCs, and the amount of carbon dioxide, selectively identifying the presence of a correlation between the occurrence of the user having the physical condition and the at least one of the temperature, the RH, the amount of particulate, the amount of VOCs, and the amount of carbon dioxide.

In further features, the indicating an occurrence of a user having a physical condition includes indicating the occurrence of the user at least one of coughing, wheezing, and sneezing based on a comparison the output from at least one of the microphone and the camera with predetermined output indicative of the at least one of coughing, wheezing, and sneezing.

In further features, the indicating an occurrence of a user having a physical condition includes indicating the occurrence of the user having watery eyes based on at least one of (a) receiving user input indicative of the user having watery eyes and (b) a comparison of the output from the camera with predetermined output indicative of watery eyes.

In further features, the method further includes: receiving, from an indoor air quality (IAQ) sensor module, the at least one of the temperature, the RH, the amount of particulate, the amount of VOCs, and the amount of carbon dioxide, the IAQ sensor module including the at least one of the temperature sensor, the RH sensor, the particulate sensor, the VOCs sensor, and the carbon dioxide sensor; and receiving, from the IAQ sensor module, the output of at least one of the microphone and the camera, the IAQ sensor module including the at least one of the microphone and the camera.

In further features, the method further includes: wirelessly transmitting, by a first transceiver via at least one antenna, the at least one of the temperature, the RH, the amount of particulate, the amount of VOCs, and the amount of carbon dioxide; wirelessly receiving, by a second transceiver via at least one antenna, the at least one of the temperature, the RH, the amount of particulate, the amount of VOCs, and the amount of carbon dioxide; and receiving the at least one of the temperature, the RH, the amount of particulate, the amount of VOCs, and the amount of carbon dioxide via the second transceiver.

In further features, selectively identifying the presence of a correlation includes selectively identifying the presence of a correlation in response to the at least one of the temperature, the RH, the amount of particulate, the amount of VOCs, and the amount of carbon dioxide changing by at least a predetermined amount during a predetermined period before the occurrence of the user having the physical condition.

In further features, selectively identifying the presence of a correlation includes selectively identifying the presence of a correlation in response to the at least one of the temperature, the RH, the amount of particulate, the amount of VOCs, and the amount of carbon dioxide being, within a predetermined period before the occurrence of the user having the physical condition, one of: greater than a predetermined value; and outside of a predetermined range.

In further features, the method further includes selectively displaying on a display of a computing device: the at least one of the RH, the amount of particulate, the amount of VOCs, and the amount of carbon dioxide over a period of time; and indicators of the occurrence of the user having the physical condition over the period of time.

In further features, the method further includes selectively turning on and off at least one of a plurality of mitigation devices based on the at least one of the temperature, the RH, the amount of particulate, the amount of VOCs, and the amount of carbon dioxide.

In further features, the method further includes: adjusting a threshold value in response to the identification of the presence of the correlation; and turning on the at least one of the plurality of mitigation devices when the at least one of the temperature, the RH, the amount of particulate, the amount of VOCs, and the amount of carbon dioxide is greater than the threshold value.

In further features, the method further includes indicating an occurrence of a user having a physical condition includes indicating the occurrence of the user having the physical condition in response to receipt of user input indicative of the user having the physical condition from a user computing device executing an application.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 6-9 are example user interfaces displayed by a user computing device during execution of an application based on data received from a remote monitoring system;

In the drawings, reference numbers may be reused to identify similar and/or identical elements.

DETAILED DESCRIPTION

Figure 1:
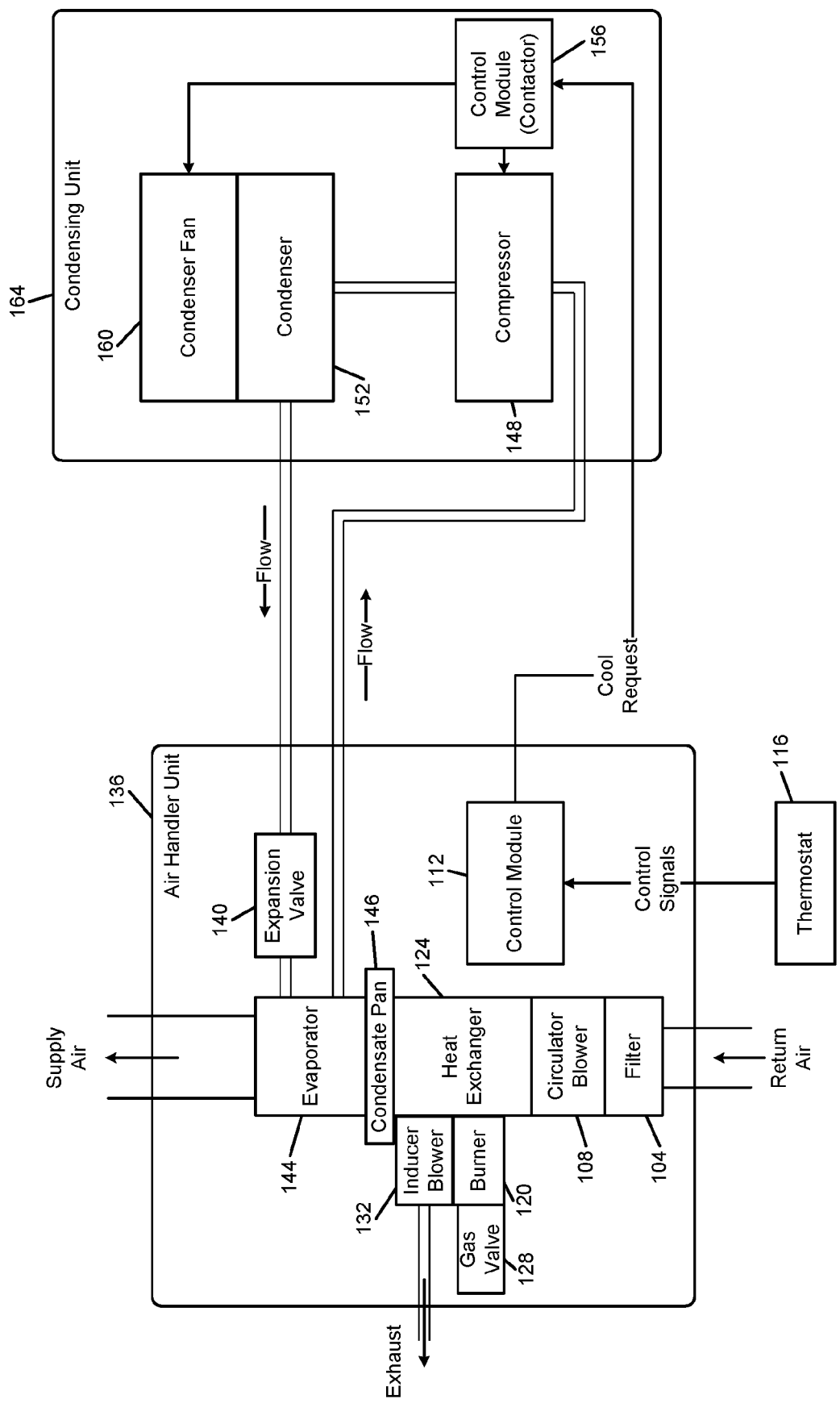
FIG. 1 is a block diagram of an example heating, ventilation, and air conditioning (HVAC) system.

According to the present disclosure, an indoor air quality (IAQ) sensor module can be used with one or more mitigation devices of a residential or light commercial HVAC (heating, ventilation, and/or air conditioning) system of a building and/or one or more other mitigation devices. The IAQ sensor module includes one, more than one, or all of a temperature sensor, a relative humidity (RH) sensor, a particulate sensor, a volatile organic compound (VOC) sensor, and a carbon dioxide ($CO_2$) sensor. The IAQ sensor module may also include one or more other IAQ sensors, such as occupancy, barometric pressure, light, sound, etc. The temperature sensor senses a temperature of air at the location of the IAQ sensor. The RH sensor measures a RH of air at the location of the IAQ sensor. The particulate sensor measures an amount (e.g., concentration) of particulate greater than a predetermined size in the air at the location of the IAQ sensor. The VOC sensor measures an amount of VOCs in the air at the location of the IAQ sensor. The carbon dioxide sensor measures an amount of carbon dioxide in the air at the location of the IAQ sensor. Other IAQ sensors would measure an amount of a substance or condition in the air at the location of the IAQ sensor.

The IAQ sensor module is wirelessly connected to a thermostat of the HVAC system, such as via a Bluetooth or WiFi. The IAQ sensor module may additionally or alternatively be wirelessly connected to a control module. The IAQ sensor module communicates measurements from its sensors, and optionally, a time and date to the thermostat and/or the control module. The control module and/or the thermostat controls operation of the mitigation devices based on the measurements from the IAQ sensor module. For example, the control module and/or the thermostat controls operation of the mitigation devices based on maintaining a temperature measured by the IAQ sensor module within upper and lower temperature limits, based on maintaining a RH measured by the IAQ sensor within upper and lower RH limits, based on maintaining the amount of particulate in the air at the IAQ sensor module below a predetermined amount of particulate, based on maintaining the amount of VOCs in the air at the IAQ sensor module below a predetermined amount of VOCs, and/or based on maintaining the amount of carbon dioxide in the air at the IAQ sensor module below a predetermined amount of carbon dioxide.

The control module and/or the thermostat can provide information on the measurements of the IAQ sensor and other data (e.g., statuses of mitigation devices, local outdoor air conditions, etc.) to one or more user devices (e.g., of tenants, occupants, customers, contractors, etc.) associated with the building. For example, the building may be a single-family residence, and the customer may be the homeowner, a landlord, or a tenant. In other implementations, the building may be a light commercial building, and the customer may be the building owner, a tenant, or a property management company.

According to the present disclosure, a microphone, a camera, and/or one or more other types of devices may be implemented within the IAQ sensor module or separately. A condition identification module may identify occurrences of a physical condition of a user (e.g., coughing, sneezing, wheezing, watery eyes, use of a medical device) via output from the microphone, the camera, and/or the other types of devices. A correlation module may identify correlations between ones of the parameters measured by the IAQ sensor module and the physical conditions of the user. The identified correlations may, for example, help a user realize correlations between ones of the parameters and the physical conditions and/or be used to adjust mitigation to prevent future occurrences of the physical condition.

As used in this application, the term HVAC can encompass all environmental comfort systems in a building, including heating, cooling, humidifying, dehumidifying, and air exchanging and purifying, and covers devices such as furnaces, heat pumps, humidifiers, dehumidifiers, ventilators, and air conditioners. HVAC systems as described in this application do not necessarily include both heating and air conditioning, and may instead have only one or the other.

In split HVAC systems, an air handler unit is often located indoors, and a condensing unit is often located outdoors. In heat pump systems, the function of the air handler unit and the condensing unit are reversed depending on the mode of the heat pump. As a result, although the present disclosure uses the terms air handler unit and condensing unit, the terms indoor unit and outdoor unit could be used instead in the context of a heat pump. The terms indoor unit and outdoor unit emphasize that the physical locations of the components stay the same while their roles change depending on the mode of the heat pump. A reversing valve selectively reverses the flow of refrigerant from what is shown in FIG. 1 depending on whether the system is heating the building or cooling the building in a heat pump system. When the flow of refrigerant is reversed, the roles of the evaporator and condenser are reversed—i.e., refrigerant evaporation occurs in what is labeled the condenser while refrigerant condensation occurs in what is labeled as the evaporator.

The control module and/or the thermostat upload data to a remote location. The remote location may be accessible via any suitable network, including the Internet. The remote location includes one or more computers, which will be referred to as servers. The servers execute a monitoring system on behalf of a monitoring company. Additionally or alternatively, a user computing device may serve as the monitoring system. The monitoring system receives and processes the data from the controller and/or thermostat of customers who have such systems installed. The monitoring system can provide performance information, diagnostic alerts, and error messages to one or more users associated with the building and/or third parties, such as designated HVAC contractors.

A server of the monitoring system includes a processor and memory. The memory stores application code that processes data received from the controller and/or the thermostat. The processor executes this application code and stores received data either in the memory or in other forms of storage, including magnetic storage, optical storage, flash memory storage, etc. While the term server is used in this application, the application is not limited to a single server.

A collection of servers may together operate to receive and process data from multiple buildings. A load balancing algorithm may be used between the servers to distribute processing and storage. The present application is not limited to servers that are owned, maintained, and housed by a monitoring company. Although the present disclosure describes diagnostics and processing and alerting occurring in a remote monitoring system, some or all of these functions may be performed locally using installed equipment and/or customer resources, such as on a customer computer or computers.

Customers and/or HVAC contractors may be notified of current and predicted issues (e.g., dirty filter) affecting effectiveness or efficiency of the HVAC system and/or the mitigating devices, and may receive notifications related to routine maintenance. The methods of notification may take the form of push or pull updates to an application, which may be executed on a smart phone, tablet, another type of mobile device, or on a computer (e.g., laptop or desktop). Notifications may also be viewed using web applications or on local displays, such as on the thermostat and/or other displays located throughout the building. Notifications may also include text messages, emails, social networking messages, voicemails, phone calls, etc.

Based on measurements from the control module, the thermostat, and/or the IAQ sensor module, the monitoring company can determine whether various components are operating at their peak performance. The monitoring company can advise the customer and a contractor when performance is reduced. This performance reduction may be measured for the system as a whole, such as in terms of efficiency, and/or may be monitored for one or more individual components.

In addition, the monitoring system may detect and/or predict failures of one or more components of the system. When a failure is detected, the customer can be notified and potential remediation steps can be taken immediately. For example, components of the HVAC system may be shut down to prevent or minimize damage, such as water damage, to HVAC components. A contractor can also be notified that a service call may be required. Depending on the contractual relationship between the customer and the contractor, the contractor may schedule a service call to the building.

The monitoring system may provide specific information to a contractor, such as identifying information of the customer's components, including make and model numbers, as well as indications of the specific part numbers of components. Based on this information, the contractor can allocate the correct repair personnel that have experience with the specific components and/or the system. In addition, a service technician is able to bring replacement parts, avoiding return trips after diagnosis.

Depending on the severity of the failure, the customer and/or contractor may be advised of relevant factors in determining whether to repair or replace some or all of the components. For example only, these factors may include relative costs of repair versus replacement, and may include quantitative or qualitative information about advantages of replacement equipment. For example, expected increases in efficiency and/or comfort with new equipment may be provided. Based on historical usage data and/or electricity or other commodity prices, the comparison may also estimate annual savings resulting from the efficiency improvement.

As mentioned above, the monitoring system may also predict impending failures. This allows for preventative maintenance and repair prior to an actual failure of components. Alerts regarding detected or impending failures reduce the time when the HVAC system is out of operation and allows for more flexible scheduling for both the customer and contractor. If the customer is out of town, these alerts may prevent damage from occurring when the customer is not present to detect the failure of a component. For example, failure of heating components of the HVAC system in winter may lead to pipes freezing and bursting.

Alerts regarding potential or impending failures may specify statistical timeframes before the failure is expected. For example only, if a sensor is intermittently providing bad data, the monitoring system may specify an expected amount of time before it is likely that the sensor effectively stops working due to the prevalence of bad data. Further, the monitoring system may explain, in quantitative or qualitative terms, how the current operation and/or the potential failure will affect operation of the HVAC system. This enables the customer to prioritize and budget for repairs.

For the monitoring service, the monitoring company may charge a periodic rate, such as a monthly rate. This charge may be billed directly to the customer and/or may be billed to the contractor. The contractor may pass along these charges to the customer and/or may make other arrangements, such as by requiring an up-front payment and/or applying surcharges to repairs and service visits.

The monitoring service allows the customer to remotely monitor real-time data within the building, outside of the building, and/or control components of the system, such as setting temperature and RH setpoints and other IAQ setpoints, enabling or disabling heating, cooling, ventilation, air purification, etc. In addition, the customer may be able to track usage data for components of the system and/or historical data.

In addition to being uploaded to the remote monitoring service (also referred to as the cloud), monitored data may be transmitted to a local device in the building. For example, a smartphone, laptop, or proprietary portable device may receive monitoring information to diagnose problems and receive real-time performance data. Alternatively, data may be uploaded to the cloud and then downloaded onto a local computing device, such as via the Internet from an interactive web site.

In FIG. 1, a block diagram of an example HVAC system is presented. In this particular example, a forced air system with a gas furnace is shown. Return air is pulled from the building through a filter 104 by a circulator blower 108. The circulator blower 108, also referred to as a fan, is controlled by a control module 112. The control module 112 receives signals from a thermostat 116. For example only, the thermostat 116 may include one or more temperature set points specified by the user.

The thermostat 116 may direct that the circulator blower 108 be turned on at all times or only when a heat request or cool request is present (automatic fan mode). In various implementations, the circulator blower 108 can operate at one or more discrete speeds or at any speed within a predetermined range. For example, the control module 112 may switch one or more switching relays (not shown) to control the circulator blower 108 and/or to select a speed of the circulator blower 108.

The thermostat 116 provides the heat and/or cool requests to the control module 112. When a heat request is made, the control module 112 causes a burner 120 to ignite. Heat from combustion is introduced to the return air provided by the circulator blower 108 in a heat exchanger 124. The heated air is supplied to the building and is referred to as supply air.

The burner 120 may include a pilot light, which is a small constant flame for igniting the primary flame in the burner 120. Alternatively, an intermittent pilot may be used in which a small flame is first lit prior to igniting the primary flame in the burner 120. A sparker may be used for an intermittent pilot implementation or for direct burner ignition. Another ignition option includes a hot surface igniter, which heats a surface to a high enough temperature that, when gas is introduced, the heated surface initiates combustion of the gas. Fuel for combustion, such as natural gas, may be provided by a gas valve 128.

The products of combustion are exhausted outside of the building, and an inducer blower 132 may be turned on prior to ignition of the burner 120. In a high efficiency furnace, the products of combustion may not be hot enough to have sufficient buoyancy to exhaust via conduction. Therefore, the inducer blower 132 creates a draft to exhaust the products of combustion. The inducer blower 132 may remain running while the burner 120 is operating. In addition, the inducer blower 132 may continue running for a set period of time after the burner 120 turns off.

A single enclosure, which will be referred to as an air handler unit 136, may include the filter 104, the circulator blower 108, the control module 112, the burner 120, the heat exchanger 124, the inducer blower 132, an expansion valve 140, an evaporator 144, and a condensate pan 146. In various implementations, the air handler unit 136 includes an electrical heating device (not shown) instead of or in addition to the burner 120. When used in addition to the burner 120, the electrical heating device may provide backup or secondary (extra) heat to the burner 120.

In FIG. 1, the HVAC system includes a split air conditioning system. Refrigerant is circulated through a compressor 148, a condenser 152, the expansion valve 140, and the evaporator 144. The evaporator 144 is placed in series with the supply air so that when cooling is desired, the evaporator 144 removes heat from the supply air, thereby cooling the supply air. During cooling, the evaporator 144 is cold (e.g., below the dew point of the air within the building), which causes water vapor to condense. This water vapor is collected in the condensate pan 146, which drains or is pumped out.

A control module 156 receives a cool request from the control module 112 and controls the compressor 148 accordingly. The control module 156 also controls a condenser fan 160, which increases heat exchange between the condenser 152 and outside air. In such a split system, the compressor 148, the condenser 152, the control module 156, and the condenser fan 160 are generally located outside of the building, often in a single condensing unit 164.

In various implementations, the control module 156 may include a run capacitor, a start capacitor, and a contactor or relay. In various implementations, the start capacitor may be omitted, such as when the condensing unit 164 includes a scroll compressor instead of a reciprocating compressor. The compressor 148 may be a variable-capacity compressor and may respond to a multiple-level cool request. For example, the cool request may indicate a mid-capacity call for cooling or a high-capacity call for cooling. The compressor 148 may vary its capacity according to the cool request.

The electrical lines provided to the condensing unit 164 may include a 240 volt mains power line (not shown) and a 24 volt switched control line. The 24 volt control line may correspond to the cool request shown in FIG. 1. The 24 volt control line controls operation of the contactor. When the control line indicates that the compressor should be on, the contactor contacts close, connecting the 240 volt power supply to the compressor 148. In addition, the contactor may connect the 240 volt power supply to the condenser fan 160. In various implementations, such as when the condensing unit 164 is located in the ground as part of a geothermal system, the condenser fan 160 may be omitted. When the 240 volt mains power supply arrives in two legs, as is common in the U.S., the contactor may have two sets of contacts, and can be referred to as a double-pole single-throw switch.

Typically, the thermostat 116 includes a temperature sensor and a relative humidity (RH) sensor. When in a heating (heat) mode, the thermostat 116 generates a heat request when the temperature measured by the temperature sensor is less than a lower temperature limit. When in a cooling (cool) mode, the thermostat 116 generates a cool request when the temperature measured by the temperature sensor is greater than an upper temperature limit. The upper and lower temperature limits may be set to a setpoint temperature + and − a predetermined amount (e.g., 1, 2, 3, 4, 5 degrees Fahrenheit), respectively. The setpoint temperature may be set to a predetermined temperature by default and may be adjusted by a user.

Figure 2A:
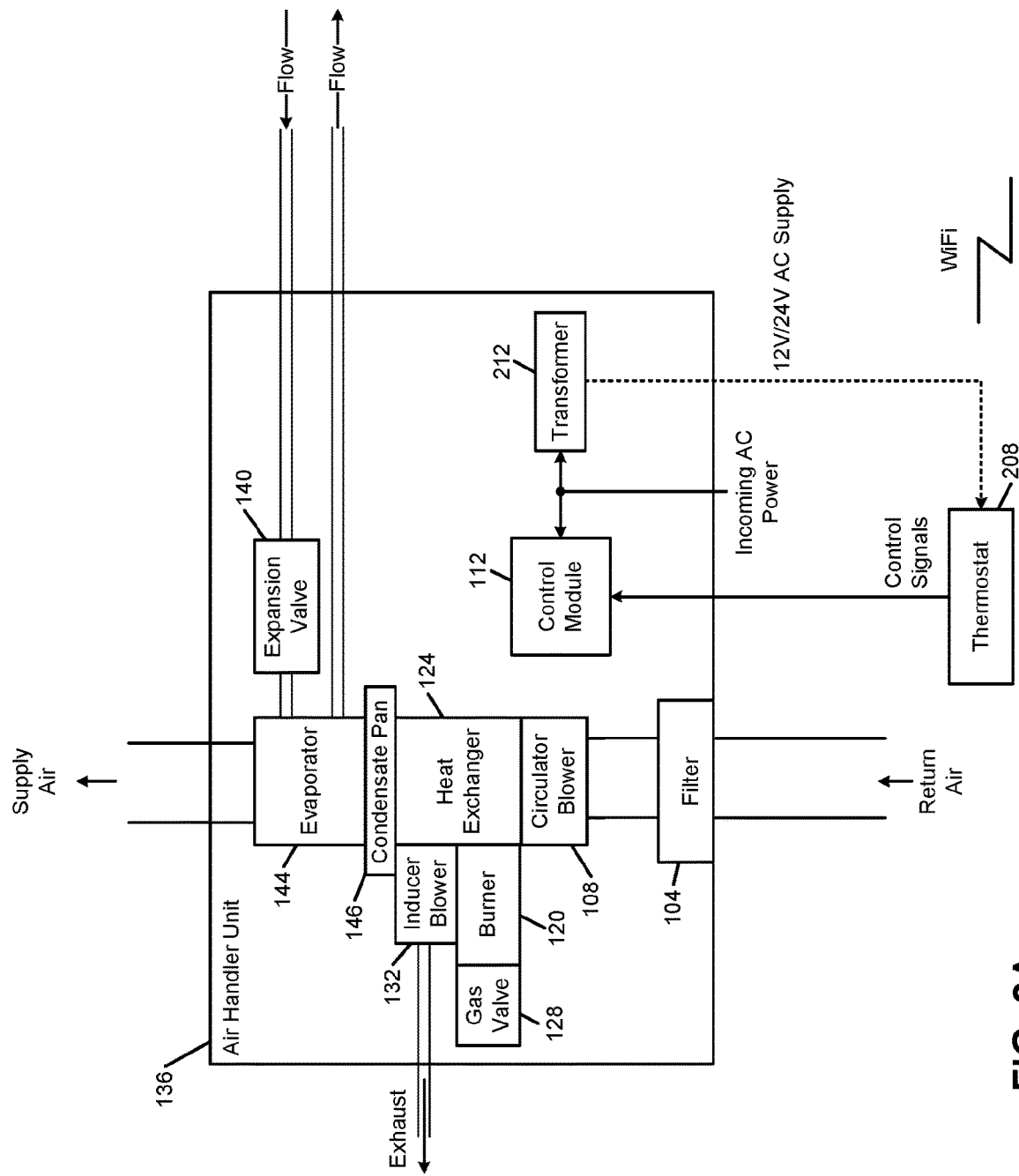
FIG. 2A is a functional block diagram of an air handler unit of an example HVAC system.
Figure 2B:
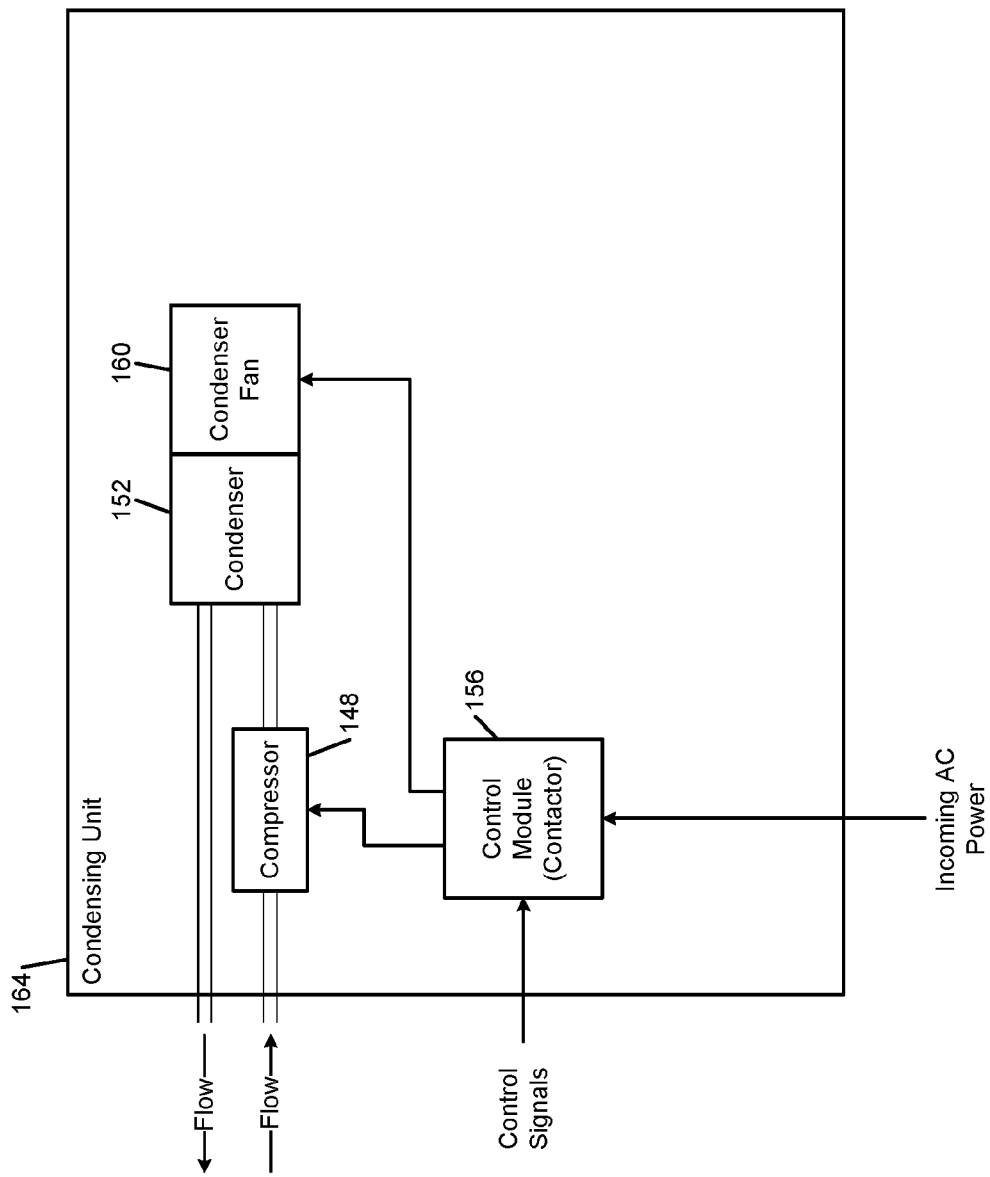
FIGS. 2B and 2C are functional block diagrams of example condenser units of example HVAC systems.

FIGS. 2A-2B are functional block diagrams of an example monitoring system associated with an HVAC system of a building. The air handler unit 136 of FIG. 1 is shown for reference. The thermostat 116 of FIG. 1 is a WiFi thermostat 208 having networking capability.

In many systems, the air handler unit 136 is located inside the building, while the condensing unit 164 is located outside the building. The present disclosure is not limited to that arrangement, however, and applies to other systems including, as examples only, systems where the components of the air handler unit 136 and the condensing unit 164 are located in close proximity to each other or even in a single enclosure. The single enclosure may be located inside or outside of the building. In various implementations, the air handler unit 136 may be located in a basement, garage, or attic. In ground source systems, where heat is exchanged with the earth, the air handler unit 136 and the condensing unit 164 may be located near the earth, such as in a basement, crawlspace, garage, or on the first floor, such as when the first floor is separated from the earth by only a concrete slab.

In FIG. 2A, a transformer 212 can be connected to an AC line in order to provide AC power to the control module 112 and the thermostat 208. For example, the transformer 212 may be a 10-to-1 transformer and therefore provide either a 12V or 24V AC supply depending on whether the air handler unit 136 is operating on nominal 120 volt or nominal 240 volt power.

The control module 112 controls operation in response to signals from the thermostat 208 received over control lines. The control lines may include a call for cool (cool request), a call for heat (heat request), and a call for fan (fan request). The control lines may include a line corresponding to a state of a reversing valve in heat pump systems.

The control lines may further carry calls for secondary heat and/or secondary cooling, which may be activated when the primary heating or primary cooling is insufficient. In dual fuel systems, such as systems operating from either electricity or natural gas, control signals related to the selection of the fuel may be monitored. Further, additional status and error signals may be monitored, such as a defrost status signal, which may be asserted when the compressor is shut off and a defrost heater operates to melt frost from an evaporator.

Figure 2C:
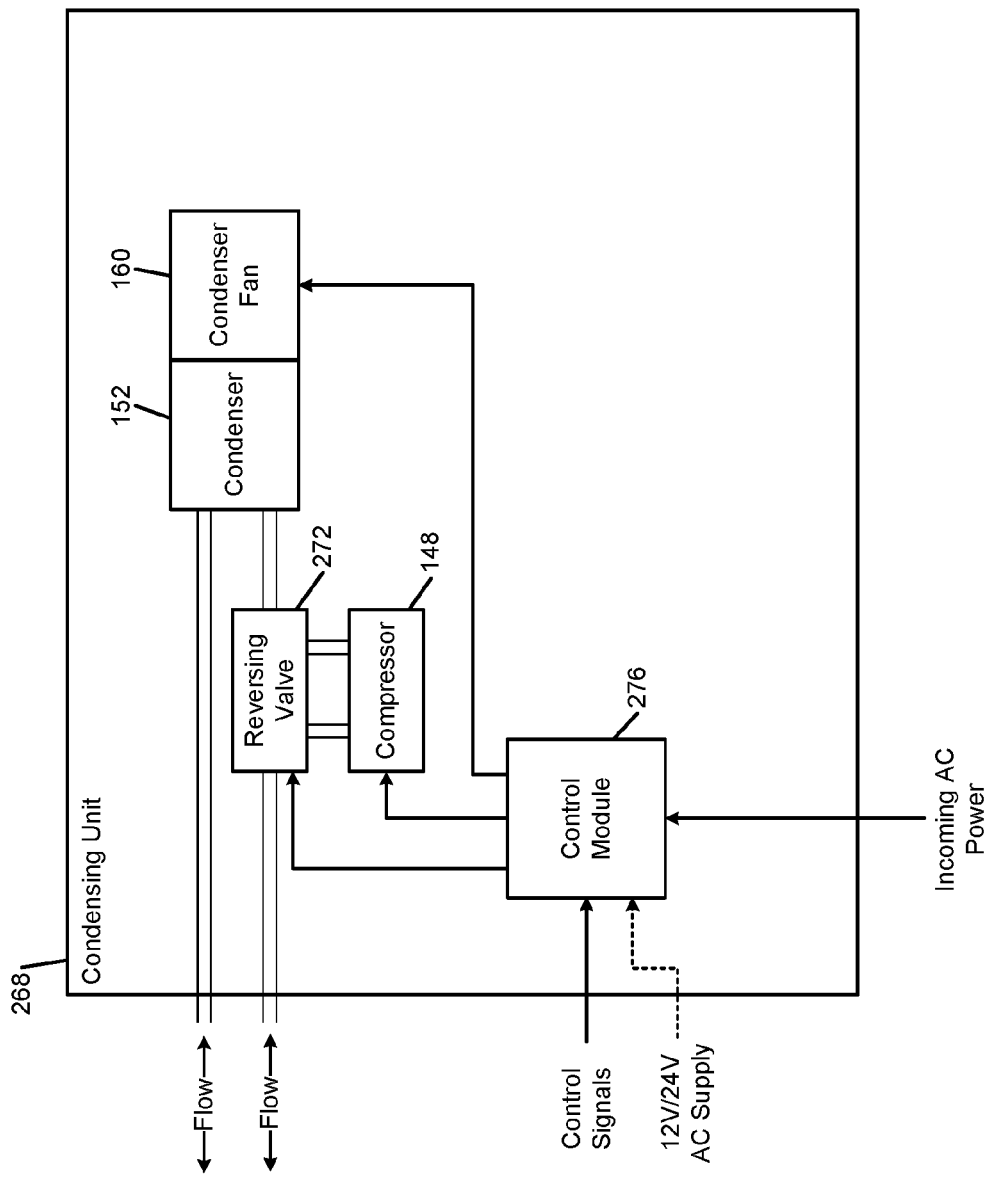

One or more of these control signals (on the control lines) is also transmitted to the condensing unit 164 (shown in FIGS. 2B and 2C). In various implementations, the condensing unit 164 may include an ambient temperature sensor that generates temperature data. When the condensing unit 164 is located outdoors, the ambient temperature represents an outside (or outdoor) ambient temperature. The temperature sensor supplying the ambient temperature may be located outside of an enclosure of the condensing unit 164. Alternatively, the temperature sensor may be located within the enclosure, but exposed to circulating air. In various implementations the temperature sensor may be shielded from direct sunlight and may be exposed to an air cavity that is not directly heated by sunlight. Alternatively or additionally, online (including Internet-based) weather data based on the geographical location of the building may be used to determine sun load, outside ambient air temperature, relative humidity, particulate, VOCs, carbon dioxide, etc.

In FIG. 2C, an example condensing unit 268 is shown for a heat pump implementation. The condensing unit 268 may be configured similarly to the condensing unit 164 of FIG. 2B. Although referred to as the condensing unit 268, the mode of the heat pump determines whether the condenser 152 of the condensing unit 268 is actually operating as a condenser or as an evaporator. A reversing valve 272 is controlled by a control module 276 and determines whether the compressor 148 discharges compressed refrigerant toward the condenser 152 (cooling mode) or away from the condenser 152 (heating mode). The control module 276 controls the reversing valve 272 and the compressor 148 based on the control signals. The control module 276 may receive power, for example, from the transformer 212 of the air handler unit 136 or via the incoming AC power line.

Figure 3A:
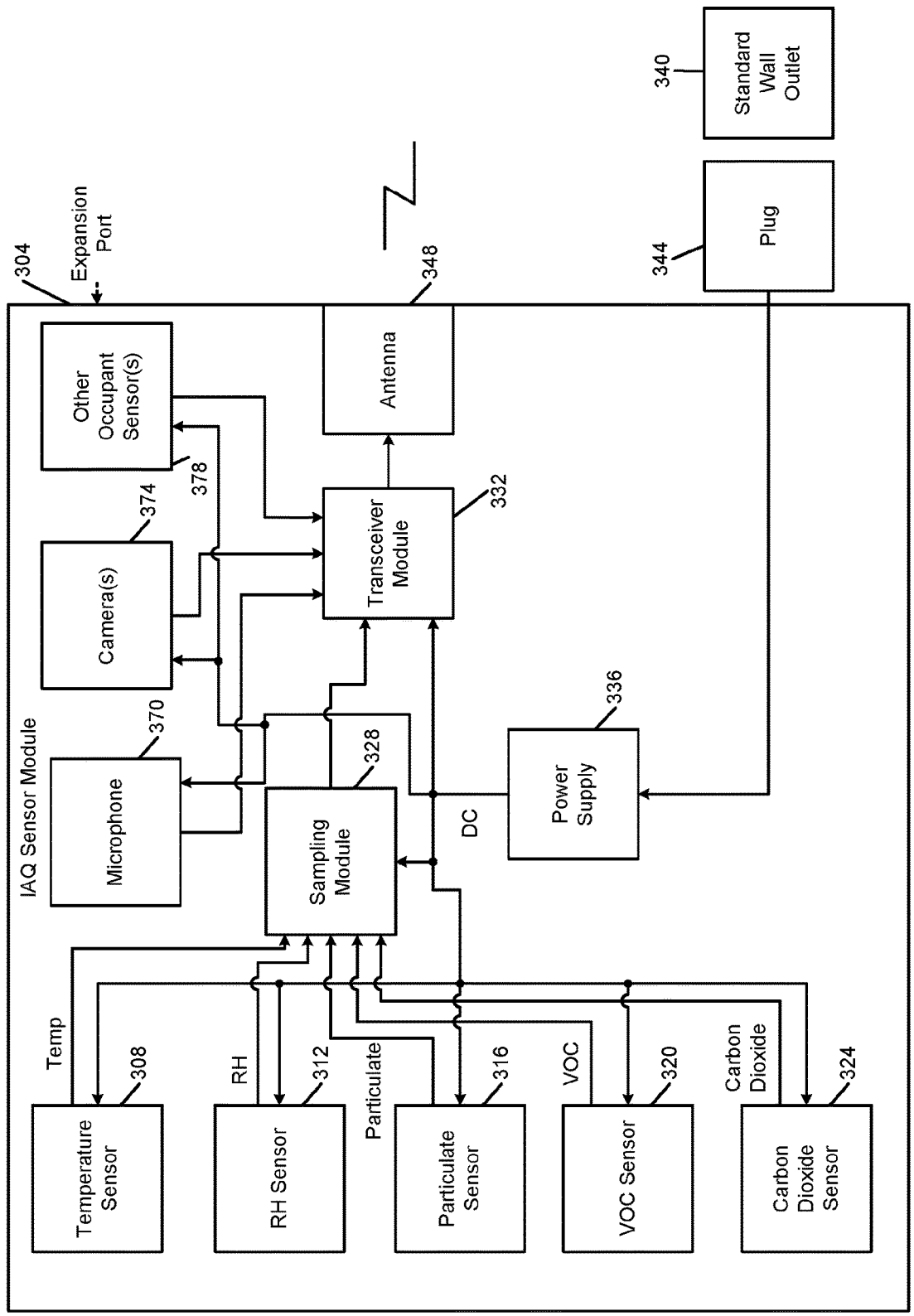
FIGS. 3A-3D include functional block diagrams including example indoor air quality (IAQ) sensor modules that can be used with an HVAC system and/or other mitigation devices.

FIG. 3A includes a functional block diagram of an example indoor air quality (IAQ) sensor module 304 that can be used with an HVAC system and/or one or more other mitigation devices. The IAQ sensor module 304 includes one, more than one, or all of: a temperature sensor 308, a relative humidity (RH) sensor 312, a particulate sensor 316, a volatile organic compounds (VOC) sensor 320, and a carbon dioxide sensor 324. The IAQ sensor module 304 may also include a sampling module 328 and a transceiver module 332.

A power supply 336 may receive AC power from a standard wall outlet (or receptacle) 340 via a plug 344. For example, the standard wall outlet 340 may provide nominal 120 volt or nominal 240 volt AC power. The power supply 336 may include an AC to direct current (DC) converter that converts the AC power into DC power, such as 5 volt, 12 volt, or 24 volt DC power. The power supply 336 supplies power to the components of the IAQ sensor module 304 including the sensors, the sampling module 328, and the transceiver module 332. While the example of the power supply 336 being integrated within the IAQ sensor module 304 is provided, the power supply 336 may be integrated with the plug 344 in various implementations. Also, while the example of the power supply 336 providing one DC voltage to the components of the IAQ sensor module 304, the power supply 336 may provide two or more different DC voltages to different components of the IAQ sensor module 304.

Figure 3B:
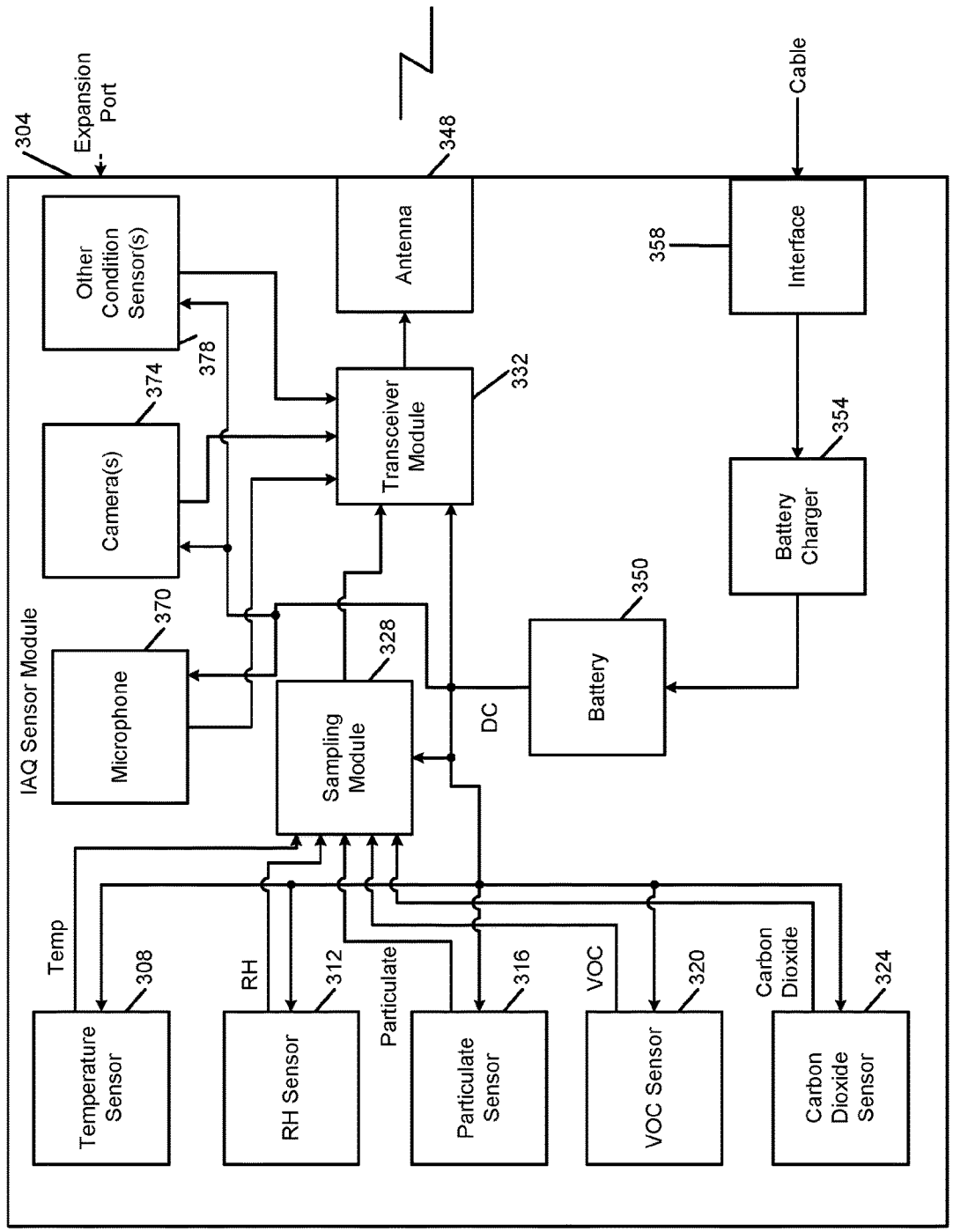

Additionally or alternatively, as shown in FIG. 3B, a battery 350 and/or one or more solar cells can supply power to the components of the IAQ sensor module 304. While the example of one battery is shown, the IAQ sensor module 304 may include more than one battery. The one or more batteries may be replaceable or non-replaceable. In the example of the one or more batteries being non-replaceable, the one or more batteries may be re-chargeable. A battery charger 354 may charge the one or more batteries. For example, the battery charger 354 may receive power via an interface port 358, such as a universal serial bus (USB) port, a DC input port, or another type of port. In various implementations, the interface port 358 may be omitted, and the battery charger 354 may be wired to receive power.

Referring to FIGS. 3A and 3B, the IAQ sensor module 304 is portable and can be moved into different rooms of a building. The IAQ sensor module 304 could also be placed outside the building, for example, to measure one or more conditions outside of the building, for calibration, or for one or more other reasons.

The temperature sensor 308 measures a temperature of air at the IAQ sensor module 304. The RH sensor 312 measures a relative humidity of air at the IAQ sensor module 304. The particulate sensor 316 measures an amount (e.g., a mass flow rate, such as micrograms (μg) per cubic meter) of particulate in air at the IAQ sensor module 304 having a diameter that is less than a predetermined size (e.g., 2.5 or 10 micrometers (μm)). The VOC sensor 320 measures an amount (e.g., parts per billion (ppb)) of VOC in air at the IAQ sensor module 304. The carbon dioxide sensor 324 measures an amount (e.g., ppm) of carbon dioxide in air at the IAQ sensor module 304. The included ones of the temperature sensor 308, the RH sensor 312, the particulate sensor 316, the VOC sensor 320, and the carbon dioxide sensor 324 will be referred to collectively as the IAQ sensors. The parameters measured by the IAQ sensors will be referred to collectively as IAQ parameters.

The sampling module 328 samples (analog) measurements of the IAQ sensors. The sampling module 328 may also digitize and/or store values of the measurements of the IAQ sensors. In various implementations, the IAQ sensors may be digital sensors and output digital values corresponding to the respective measured parameters. In such implementations, the sampling module 328 may perform storage or may be omitted.

The IAQ sensor module 304 may include one or more expansion ports to allow for connection of additional sensors and/or to allow connection to other devices. Examples of other devices include one or more other IAQ sensor modules, one or more other types of the IAQ sensors not included in the IAQ sensor module 304, a home security system, a proprietary handheld device for use by contractors, a mobile computing device, and other types of devices.

The IAQ sensor module 304 may also include a microphone 370, a camera 374, and/or one or more other types of condition sensors 378. The microphone 370 generates signals based on sound received (e.g., by users) at the microphone 370. The camera 374 captures images within a predetermined FOV of the camera 374. The predetermined FOV of the camera 374 may be fixed or variable. Examples of other types of condition sensors 378 include, but are not limited to, radar sensors, sonar sensors, optical sensors, infrared (IR) sensors, medical devices, etc. While the example of the microphone 370 and the camera 374 is provided, two or more microphones and/or two or more cameras may be implemented. The microphone 370, the camera 374, and the other types of condition sensors 378 will collectively be referred to as condition sensors. The condition sensors detect and indicate when a human experiences one or more medical conditions that may be related to IAQ, such as coughing, wheezing, watery eyes, and other types of medical conditions that may be related to IAQ.

The transceiver module 332 transmits frames of data corresponding to predetermined periods of time. Each frame of data may include the measurements of the IAQ sensors and data captured by the condition sensors over a predetermined period. One or more calculations may be performed for the data of each frame of data, such as averaging the measurements of one or more of the IAQ sensors. The measurements of the IAQ sensors may be sampled at a predetermined rate, such as 10 samples per minute or another suitable rate. The image capture rate of the camera 374 may be the predetermined rate or another (e.g., faster) predetermined rate. Each frame may correspond to a predetermined number of sets of samples (e.g., 10). The measurements of the condition sensors may also be sampled at the predetermined rate or another (e.g., faster) predetermined rate. The monitoring system may provide visual representations of the measurements over predetermined periods of time along with other data, as discussed further below.

The transceiver module 332 transmits each frame (including the calculations, the measurements, and/or the captured data) to an IAQ control module 404 and/or the thermostat 208. The transceiver module 332 transmits the frames wirelessly via one or more antennas, such as antenna 348, using a proprietary or standardized, wired or wireless protocol, such as Bluetooth, ZigBee (IEEE 802.15.4), 900 Megahertz, 2.4 Gigahertz, WiFi (IEEE 802.11). The IAQ sensor module 304 may communicate directly with the IAQ control module 404 and/or the thermostat 208 or with a separate computing device, such as a smartphone, tablet, or another type of computing device. In various implementations, a gateway 408 is implemented, which creates a wireless network for the IAQ sensor module 304, the IAQ control module 404, and the thermostat 208. The gateway 408 may also interface with a customer router 412 using a wired or wireless protocol, such as Ethernet (IEEE 802.3).

Figure 3C:
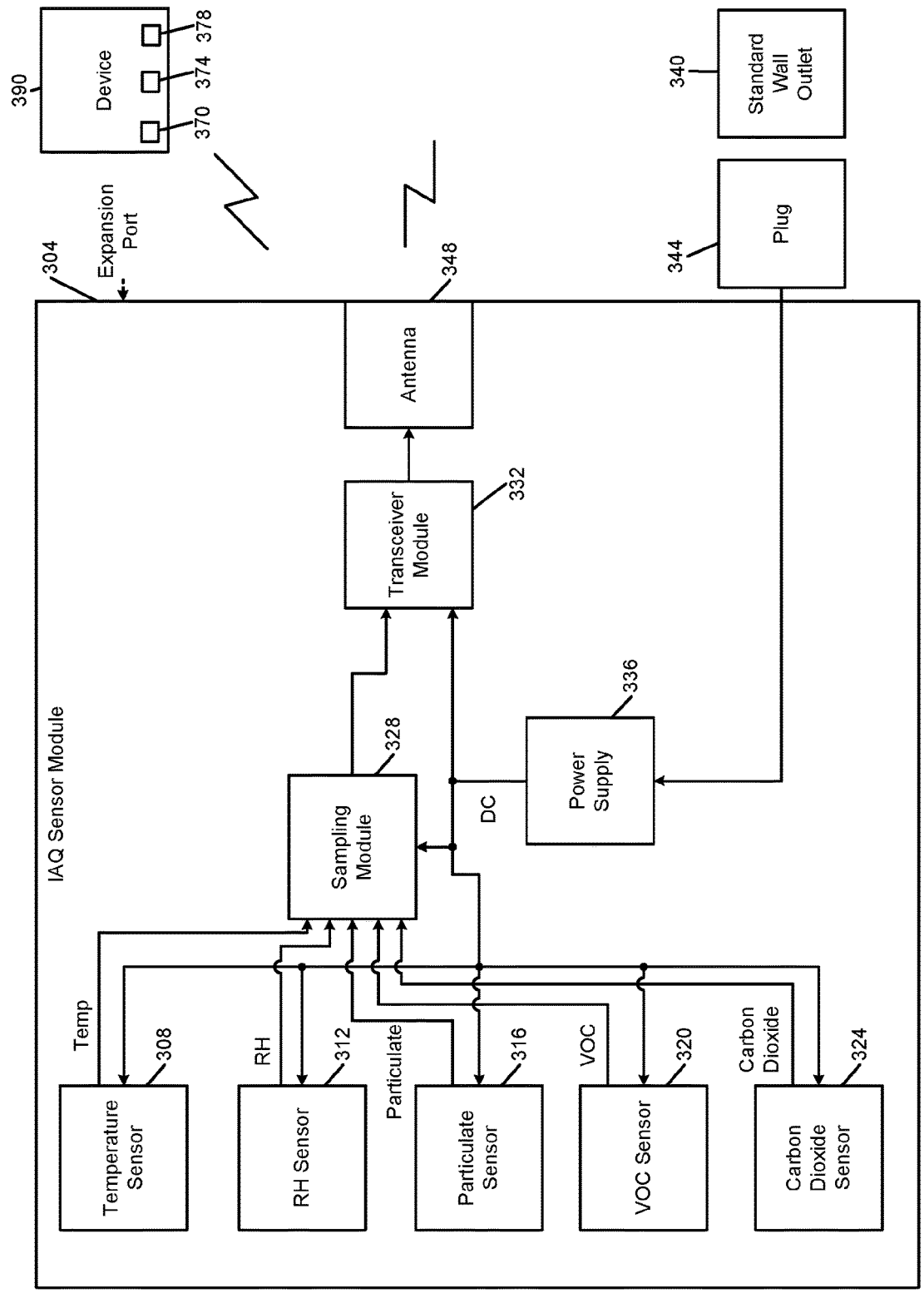
Figure 3D:
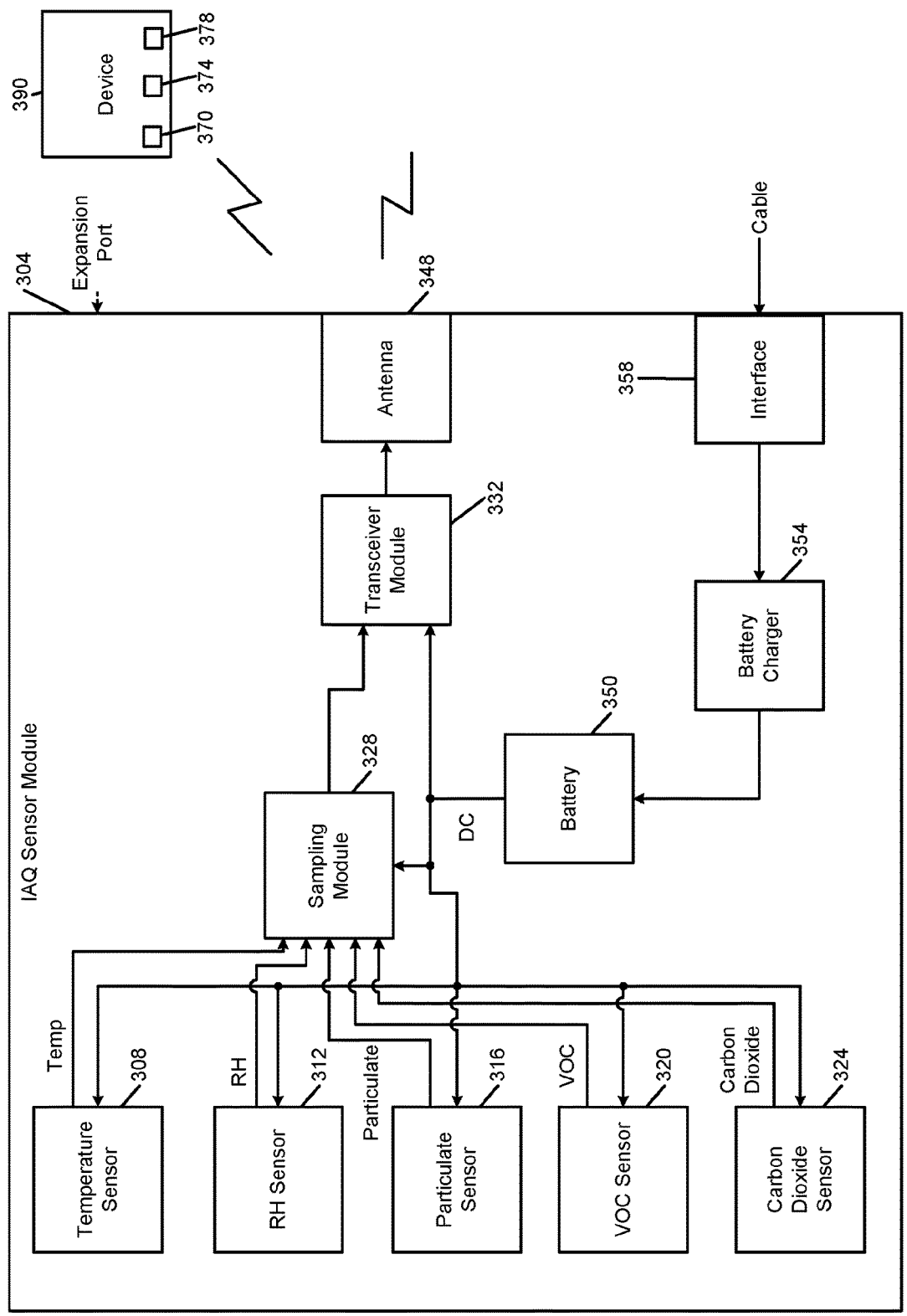

As shown in FIGS. 3C and 3D, one or more of the microphone 370, the camera 374, and the other types of condition sensors 378 may be implemented in another device 390 that is separate from the IAQ sensor module 304. Examples of the other device 390 include, for example, smart home devices such as smart speakers, smart televisions, video gaming systems, etc. The other device 390 transmits the data wirelessly to the IAQ sensor module 304 or the IAQ control module 404.

Figure 4A:
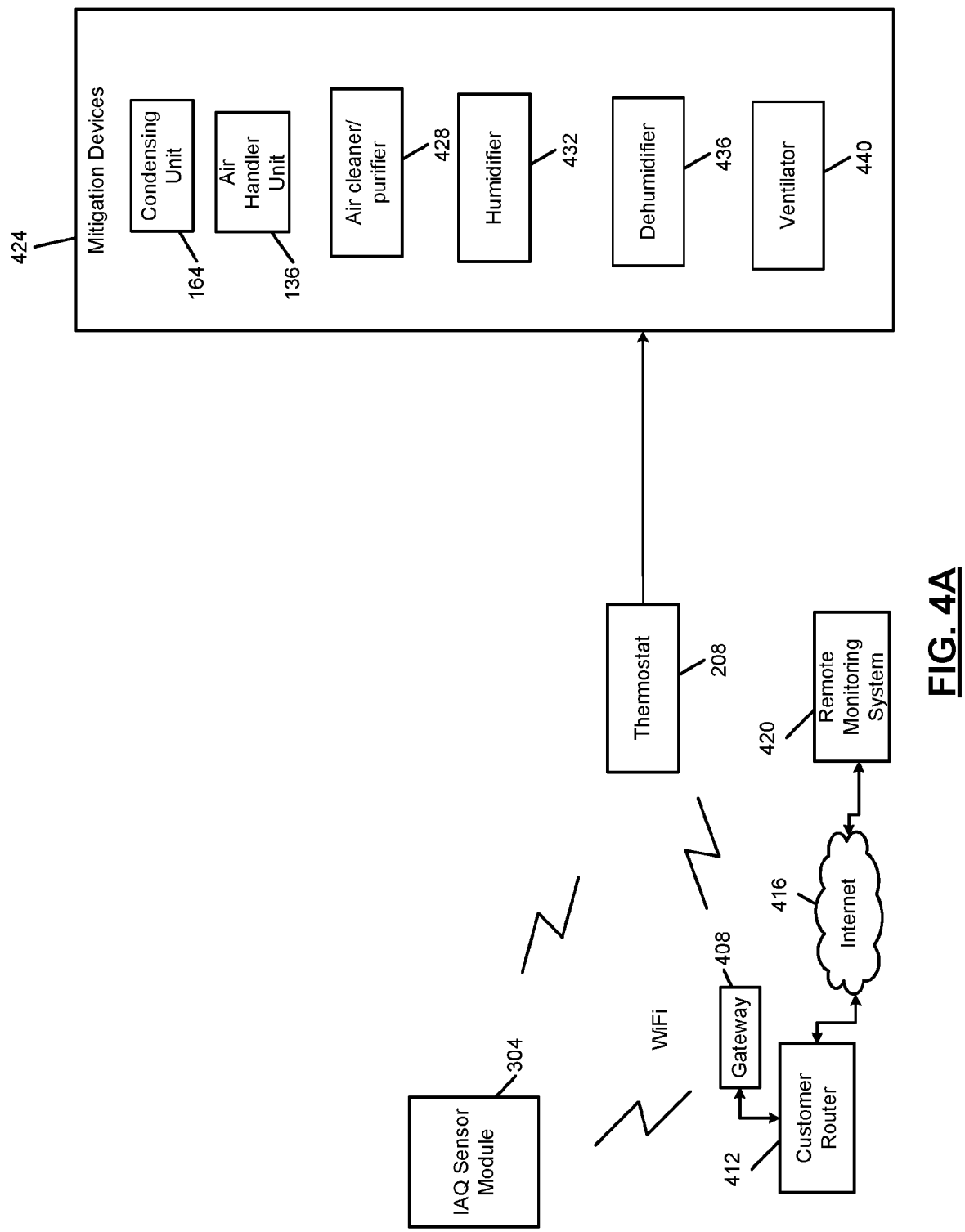
FIGS. 4A-4C are a functional block diagram of an example IAQ control system.
Figure 4B:
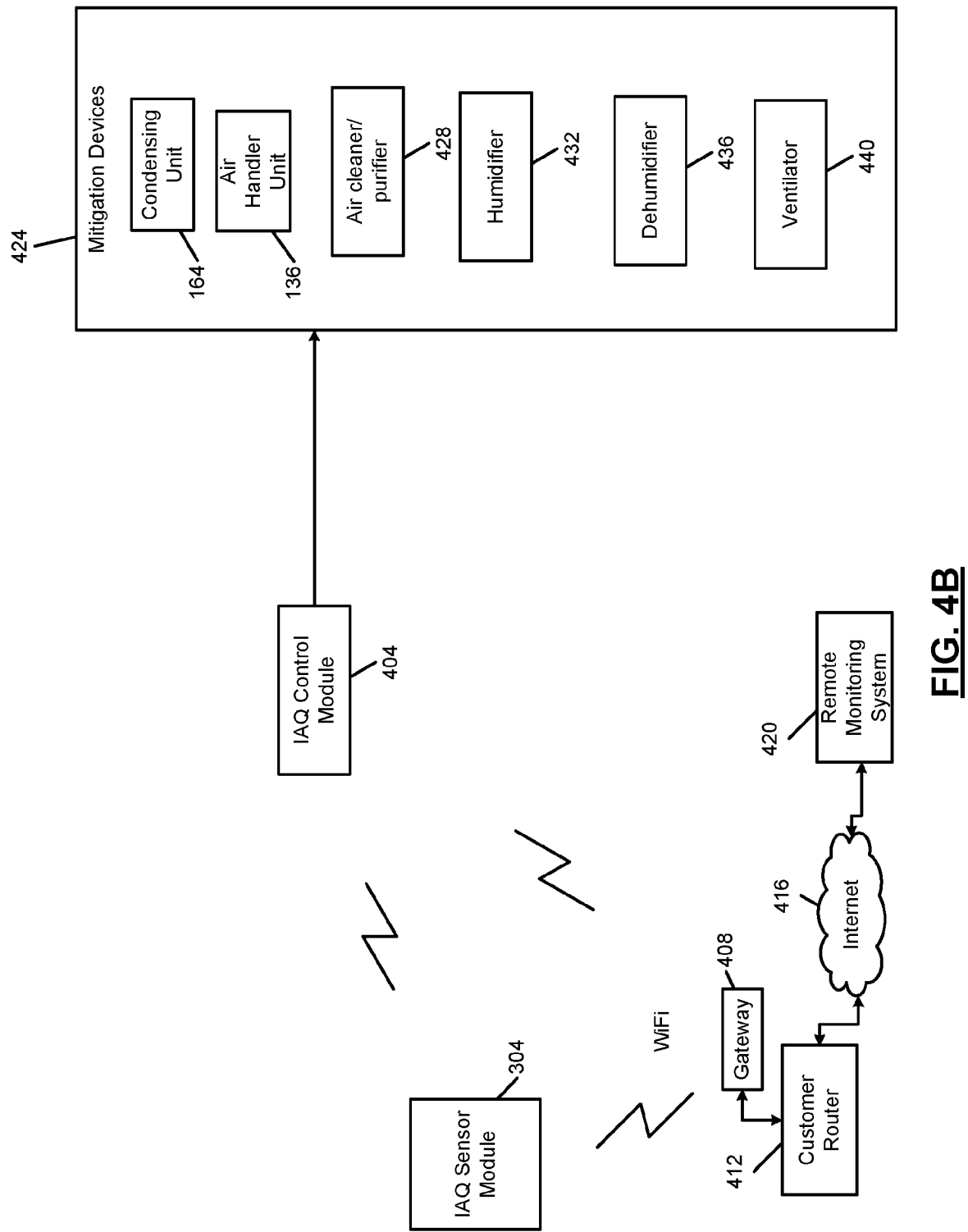
Figure 4C:
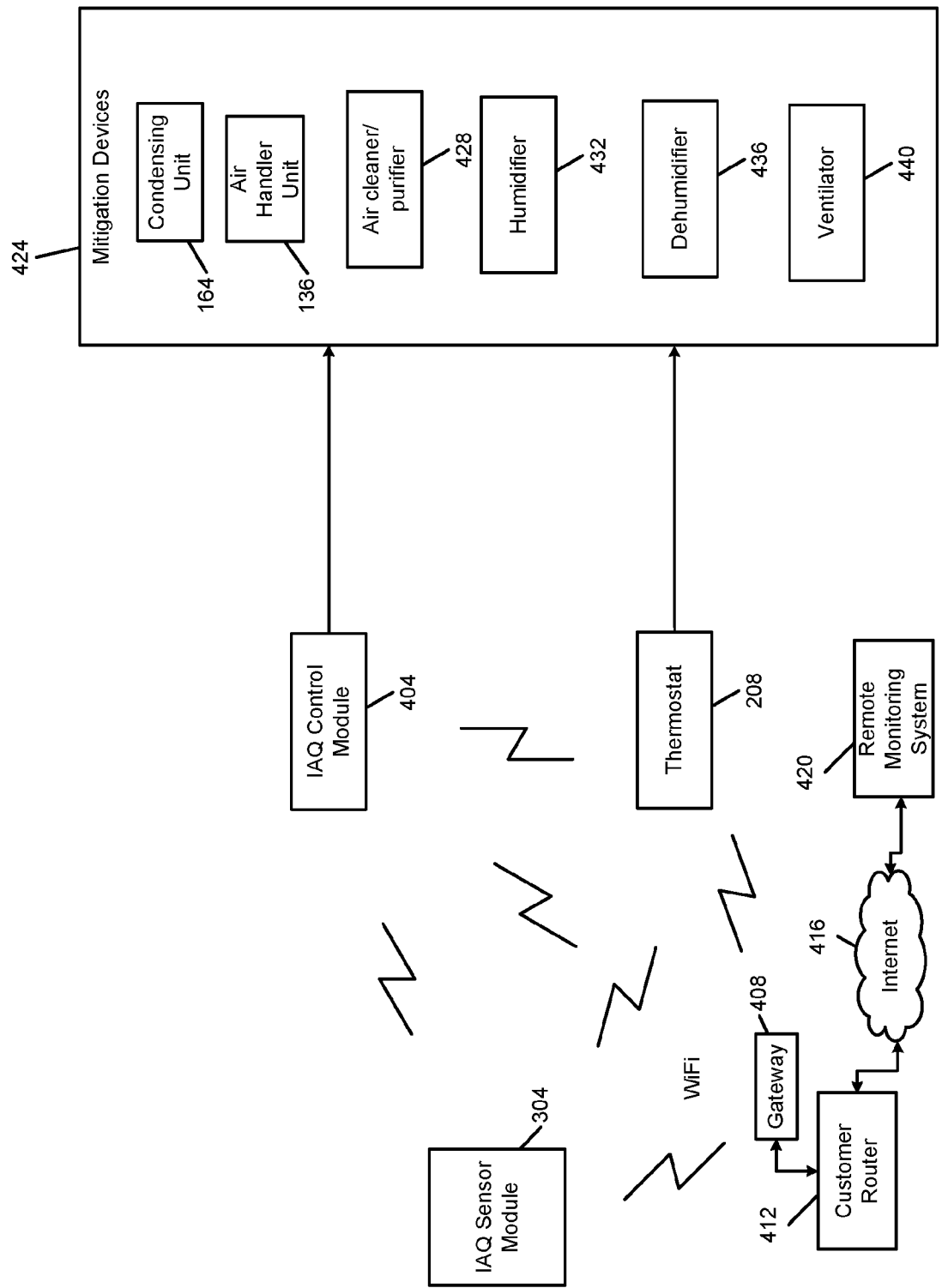

Referring now to FIGS. 4A-4C, functional block diagrams of example IAQ control systems are presented. The IAQ control module 404 may communicate with the customer router 412 using WiFi. Alternatively, the IAQ control module 404 may communicate with the customer router 412 via the gateway 408. The thermostat 208 may also communicate with the customer router 412 using WiFi or via the gateway 408. In various implementations, the IAQ control module 404 and the thermostat 208 may communicate directly or via the gateway 408.

The IAQ sensor module 304, the IAQ control module 404, and/or the thermostat 208 transmits data measured by the IAQ sensor module 304 and parameters of the IAQ control module 404 and/or the thermostat 208 over a wide area network 416, such as the Internet (referred to as the Internet 416). The IAQ sensor module 304, the IAQ control module 404, and/or the thermostat 208 may access the Internet 416 using the customer router 412 of the customer. The customer router 412 may already be present to provide Internet access to other devices (not shown) within the building, such as a customer computer and/or various other devices having Internet connectivity, such as a DVR (digital video recorder) or a video gaming system.

The IAQ sensor module 304, the IAQ control module 404, and/or the thermostat 208 transmit the data to a remote monitoring system 420 via the Internet 416 using the customer router 412. Further discussion of the remote monitoring system 420 is provided below.

The IAQ control module 404 and/or the thermostat 208 control operation (e.g., on, off, speed, etc.) of mitigation devices 424 based on the measurements from the IAQ sensor module 304. For example, the measurements of the IAQ sensor module 304 may be provided to the thermostat 208 and the thermostat 208 may control operation of the mitigation devices 424 in various implementations (e.g., FIG. 4A). The IAQ control module 404 can be omitted in such implementations. While the example of the thermostat 208 controlling the mitigation devices 424 will be discussed, alternatively the IAQ control module 404 may control operation of the mitigation devices 424 (e.g., FIG. 4B), or the thermostat 208 and the IAQ control module 404 may together control the mitigation devices 424 (e.g., FIG. 4C).

The IAQ control module 404 and/or the thermostat 208 control and communicate with the mitigation devices 424 wirelessly, by wire, using a combination of wireless and wired connections. In the case of wireless control and communication, the IAQ control module 404, the thermostat 208, and the mitigation devices 424 include respective transceivers.

The mitigation devices 424 include: (i) the condensing unit 164, (ii) the air handler unit 136 (e.g., the circulator blower 108), (iii) an air cleaner/purifier 428, (iv) a humidifier 432, (v) a dehumidifier 436, and (vi) a ventilator 440. The air cleaner/purifier 428 may be separate from the air handler unit 136 (e.g., a standalone air cleaner/purifier). In various implementations, the air handler unit 136 may serve as the air cleaner/purifier 428. The air cleaner/purifier 428 draws in air and forces the air through a filter before expelling filtered air to the building. The filter may be rated (e.g., minimum efficiency reporting value, MERV) to remove a predetermined amount (e.g., 95%) of particulate of the size measured by the particulate sensor 316. Operation of the air cleaner/purifier 428 may include whether the air cleaner/purifier 428 is on or off and, when on, a speed of the air cleaner/purifier 428. The air cleaner/purifier 428 may have a single speed or multiple discrete speeds.

Operation of the air cleaner/purifier 428 may be controlled via wire or wirelessly by the thermostat 208. Examples of wireless communication and control include, but are not limited to, Bluetooth connections and WiFi connections. For example only, the thermostat 208 may wirelessly control whether the air cleaner/purifier 428 is on or off and, if on, the speed of the air cleaner/purifier 428. As one example, the thermostat 208 may turn the air cleaner/purifier 428 on when the amount of particulate measured by the particulate sensor 316 is greater than a first predetermined amount of particulate. The thermostat 208 may leave the air cleaner/purifier 428 on until the amount of particulate measured by the particulate sensor 316 is less than a second predetermined amount of particulate that is less than the first predetermined amount of particulate. The thermostat 208 may turn the air cleaner/purifier 428 off when the amount of particulate measured by the particulate sensor 316 is less than the second predetermined amount of particulate. In various implementations, the thermostat 208 may vary the speed of the air cleaner/purifier 428 based on the amount of particulate measured by the particulate sensor 316. For example, the thermostat 208 may increase the speed of the air cleaner/purifier 428 as the amount of particulate increases and vice versa.

The humidifier 432 humidifies air within the building. The humidifier 432 may be included with the air handler unit 136 or a standalone humidifier. For example, when included with the air handler unit 136, the humidifier 432 may add moisture to the supply air before the supply air is output from vents to the building. The humidifier 432 may add moisture to air, for example, by supplying water to a medium (e.g., a pad) and forcing air (e.g., supply air) through the hydrated medium. Alternatively, the humidifier 432 may spray water in the form of mist into air (e.g., supply air). In the example of a standalone humidifier, the humidifier 432 may spray water in the form of mist into air.

Operation of the humidifier 432 may include whether the humidifier 432 is on or off. In various implementations, operation of the humidifier 432 may also include a humidification rate (e.g., an amount of water supplied to the pad or into the air as mist). The humidifier 432 may be configured to provide only a single humidification rate or multiple different humidification rates.

Operation of the humidifier 432 may be controlled via wire or wirelessly by the thermostat 208. For example only, the thermostat 208 may control (by wire) whether the humidifier 432 included with the air handler unit 136 is on or off. As another example, if the humidifier 432 is implemented separately from the air handler unit 136, the thermostat 208 may wirelessly control whether the humidifier 432 is on or off and a humidification rate when on. Examples of wireless communication include, but are not limited to, Bluetooth connections and WiFi connections. For example only, the thermostat 208 may turn the humidifier 432 on when the RH measured by the RH sensor 312 is less than a first predetermined RH. The thermostat 208 may leave the humidifier 432 on until the RH measured by the RH sensor 312 is greater than a second predetermined RH that is greater than the first predetermined RH. The thermostat 208 may turn the humidifier 432 off when the RH measured by the RH sensor 312 is greater than the second predetermined RH.

The dehumidifier 436 dehumidifies (i.e., removes humidity from) air within the building. The dehumidifier 436 may be included with the air handler unit 136 or a standalone dehumidifier. For example, the dehumidifier 436 may draw moisture from the supply air (or add dry air to the supply air) before the supply air is output from vents to the building. Operation of the dehumidifier 436 may include whether the dehumidifier 436 is on or off.

Operation of the dehumidifier 436 may be controlled via wire or wirelessly by the thermostat 208. For example only, the thermostat 208 may control (by wire) whether the dehumidifier 436 included with the air handler unit 136 is on or off. As another example, the thermostat 208 may wirelessly control whether the dehumidifier 436, implemented as a standalone device, is on or off. For example only, the thermostat 208 may turn the dehumidifier 436 on when the RH measured by the RH sensor 312 is greater than a third predetermined RH. The third predetermined RH may be the same as the second predetermined RH or different than (e.g., greater than) the second predetermined RH. The thermostat 208 may leave the dehumidifier 436 on until the RH measured by the RH sensor 312 is less than a fourth predetermined RH that is less than the third predetermined RH. The thermostat 208 may turn the dehumidifier 436 off when the RH measured by the RH sensor 312 is less than the fourth predetermined RH. The fourth predetermined RH may be the same as the first predetermined RH or different than (e.g., greater than) the first predetermined RH.

The ventilator 440 vents air from within the building out of the building. This also passively draws air from outside of the building into the building. The ventilator 440 may be included with the air handler unit 136 (e.g., the inducer blower 132) or a standalone ventilator. Examples of standalone ventilators include blowers that blow air from within the building out of the building (e.g., range hoods fans, bathroom fans, the inducer blower, etc.). Operation of the ventilator 440 may include whether the ventilator 440 is on or off and, when on, a speed. The ventilator 440 may be configured to operate at a single speed or multiple different speeds.

Operation of the ventilator 440 may be controlled via wire or wirelessly by the thermostat 208. For example only, the thermostat 208 may wirelessly control whether the ventilator 440 is on or off and, if on, the speed of the ventilator 440. As one example, the thermostat 208 may turn the ventilator 440 on when the amount of VOCs measured by the VOC sensor 320 is greater than a first predetermined amount of VOCs. The thermostat 208 may leave the ventilator 440 on until the amount of VOCs measured by the VOC sensor 320 is less than a second predetermined amount of VOCs that is less than the first predetermined amount of VOCs. The thermostat 208 may turn the ventilator 440 off when the amount of VOCs measured by the VOC sensor 320 is less than the second predetermined amount of VOCs.

As another example, the thermostat 208 may turn the ventilator 440 on when the amount of carbon dioxide measured by the carbon dioxide sensor 324 is greater than a first predetermined amount of carbon dioxide. The thermostat 208 may leave the ventilator 440 on until the amount of carbon dioxide measured by the carbon dioxide sensor 324 is less than a second predetermined amount of carbon dioxide that is less than the first predetermined amount of carbon dioxide. The thermostat 208 may turn the ventilator 440 off when the amount of carbon dioxide measured by the carbon dioxide sensor 324 is less than the second predetermined amount of carbon dioxide.

The mitigation devices described above are only described as example. One or more of the example mitigation devices may be omitted. One or more other types of mitigation devices may be included. Additionally, while the example of only one of each type of mitigation device is provided, two or more of a given type of mitigation device may be included and controlled.

Changes in temperature and/or humidity also cause changes in particulate, VOCs, and/or carbon dioxide. For example, a change in temperature may cause a change in VOCs, RH, particulate, and/or carbon dioxide. As another example, a change in RH may cause a change in particulate, VOCs, and/or carbon dioxide. For example, particulate may increase as RH increases and vice versa.

The thermostat 208 therefore controls operation of the mitigation devices 424 based on all of the parameters measured by the IAQ sensor module 304 in an attempt to: adjust the temperature within a predetermined temperature range, adjust the RH within a predetermined RH range, adjust the amount of particulate (if measured) to less than a predetermined amount of particulate, adjust the amount of VOCs (if measured) to less than a predetermined amount of VOCs, and to adjust the amount of carbon dioxide (if measured) to less than a predetermined amount of carbon dioxide.

Figure 5A:
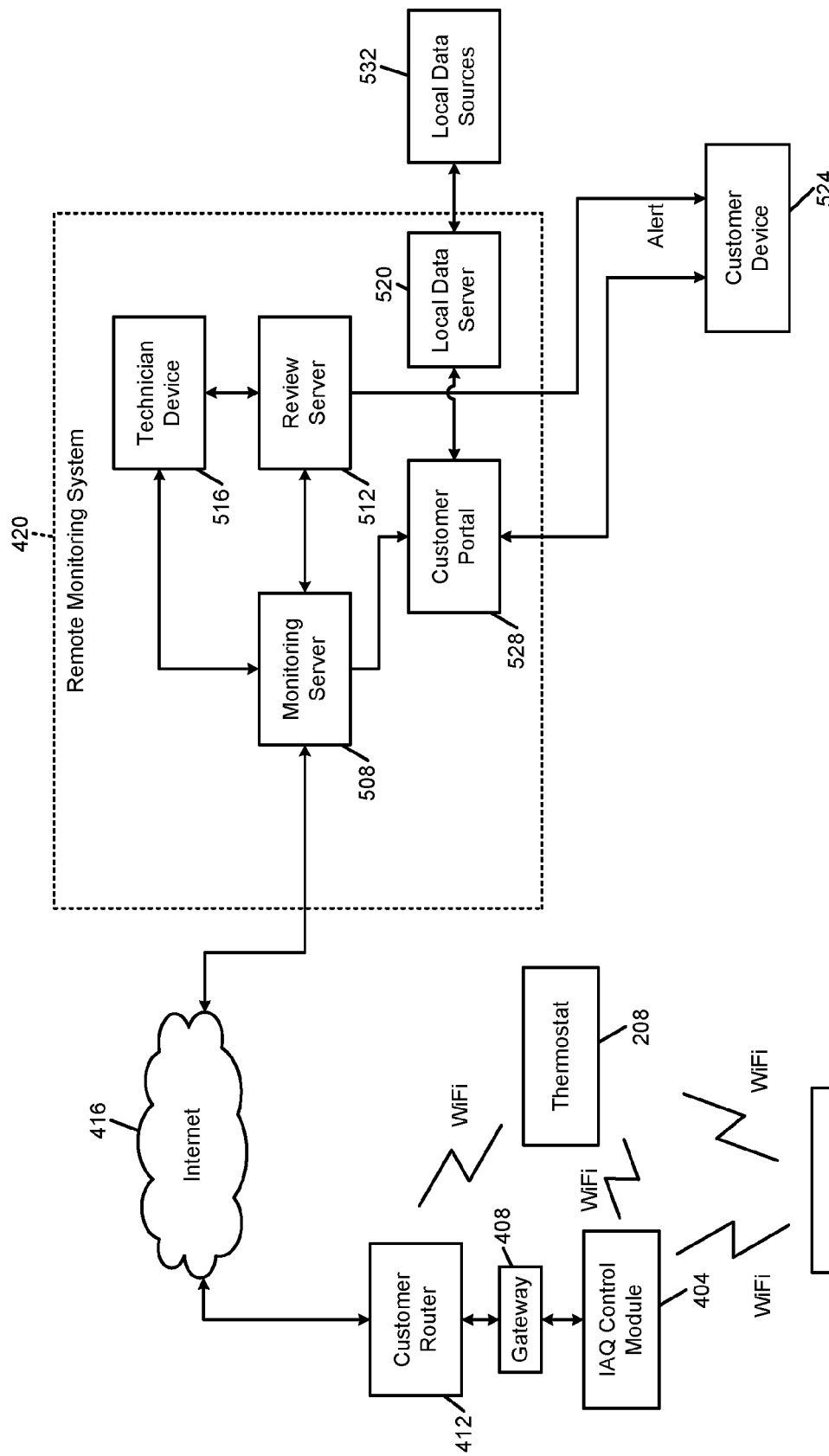
FIG. 5A is a functional block diagram of an example remote monitoring system.

FIG. 5A includes a functional block diagram of an example monitoring system. In FIG. 5A, the IAQ control module 404 and/or the thermostat 208 are shown transmitting, using the customer router 412, data to the remote monitoring system 420 via the Internet 416. In other implementations, the IAQ control module 404 and/or the thermostat 208 may transmit the data to an external wireless receiver. The external wireless receiver may be a proprietary receiver for a neighborhood in which the building is located, or may be an infrastructure receiver, such as a metropolitan area network (such as WiMAX), a WiFi access point, or a mobile phone base station.

The remote monitoring system 420 includes a monitoring server 508 that receives data from the IAQ control module 404 and/or the thermostat 208 and maintains and verifies network continuity with the IAQ control module 404 and/or the thermostat 208. The monitoring server 508 executes various algorithms to store setpoints for the building and to store measurements from the thermostat 208 and/or the IAQ sensor module 304 taken over time.

The monitoring server 508 may notify a review server 512 when one or more predetermined conditions are satisfied. This programmatic assessment may be referred to as an advisory. Some or all advisories may be triaged by a technician to reduce false positives and potentially supplement or modify data corresponding to the advisory. For example, a technician device 516 operated by a technician may be used to review the advisory and to monitor data (in various implementations, in real-time) from the IAQ control module 404 and/or the thermostat 208 via the monitoring server 508.

A technician using the technician device 516 may review the advisory. If the technician determines that a problem or fault is either already present or impending, the technician instructs the review server 512 to send an alert to a customer device 524 that is associated with the building. The technician may be determine that, although a problem or fault is present, the cause is more likely to be something different than specified by the automated advisory. The technician can therefore issue a different alert or modify the advisory before issuing an alert based on the advisory. The technician may also annotate the alert sent to the customer device 524 with additional information that may be helpful in identifying the urgency of addressing the alert and presenting data that may be useful for diagnosis or troubleshooting.

In various implementations, minor problems may not be reported to the customer device 524 so as not to alarm the customer or inundate the customer with alerts. The review server 512 (or a technician) may determine whether a problem is minor based on a threshold. For example, an efficiency decrease greater than a predetermined threshold may be reported to the customer device 524, while an efficiency decrease less than the predetermined threshold may not be reported to the customer device 524.

In various implementations, the technician device 516 may be remote from the remote monitoring system 420 but connected via a wide area network. For example only, the technician device 516 may include a computing device such as a laptop, desktop, smartphone, or tablet.

Using the customer device 524 executing an application, the customer can access a customer portal 528, which provides historical and real-time data from the IAQ control module 404 and/or the thermostat 208. The customer portal 528 may also provide setpoints and predetermined ranges for each of the measurements, local outdoor air quality data, statuses of the mitigation devices 424 (e.g., on or off), and other data to the customer device 524. Via the customer device 524, the customer may change the setpoints and predetermined ranges. The monitoring server 508 transmits changed setpoints and predetermined ranges to the thermostat 208 and/or the IAQ control module 404 for use in controlling operation of the mitigation devices 424.

The remote monitoring system 420 includes a local data server 520 that obtains local data at (outside) the building. The local data server 520 may obtain the local data from one or more local data sources 532 via a wide area network, such as the internet 416, using a geographical location of the building. The geographical location may be, for example, an address, zip code, coordinates, or other geographical identifier of the building. The remote monitoring system 420 may obtain the geographical location of the building, for example, via the customer device 524 before providing data to the customer device 524. The local data includes, for example, air temperature within a predetermined geographical area including the geographical location of the building, RH within the predetermined geographical area, amount of VOCs in the air within the predetermined geographical area, amount of particulate of the predetermined size measured by the particulate sensor 316 within the predetermined geographical area, and amount of carbon dioxide within the predetermined geographical area.

Figure 5B:
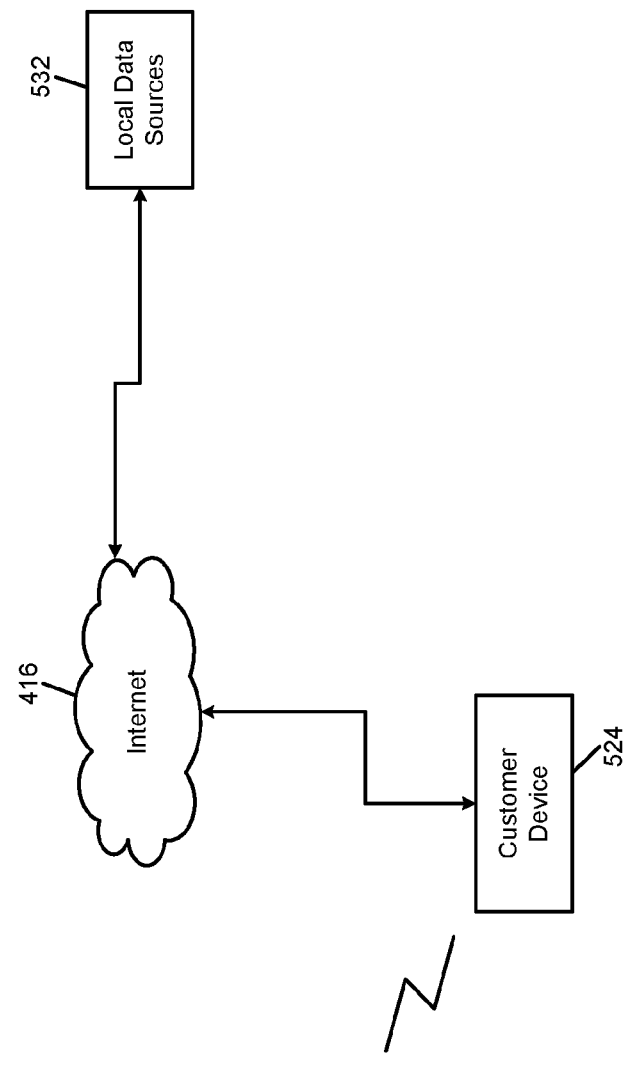
FIG. 5B is a functional block diagram of an example monitoring system.
Figure 5B:
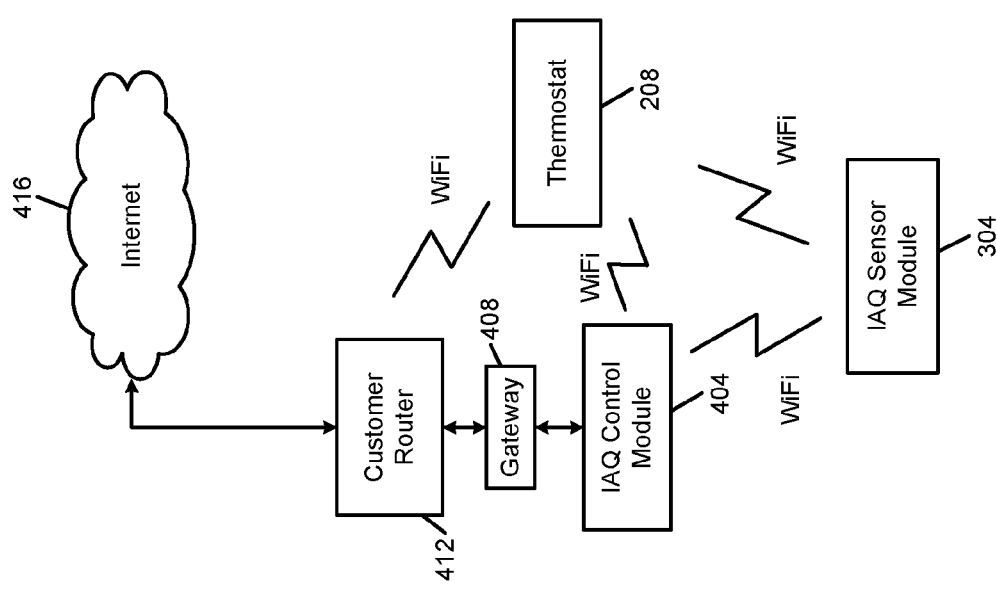

FIG. 5B includes a functional block diagram of an example monitoring system where the customer device 524 serves as a monitoring system and provides the functionality of the remote monitoring system 420. The thermostat 208 and/or the IAQ control module 404 transmit data to the customer device 524 wirelessly, such as via a Bluetooth connection, WiFi, or another wireless connection. The customer device 524 may obtain the local data from the local data sources 532 via a wide area network, such as the internet 416. Alternatively, the IAQ control module 404 or the thermostat 208 may serve as a monitoring system and provide the functionality of the remote monitoring system 420.

Figure 6:
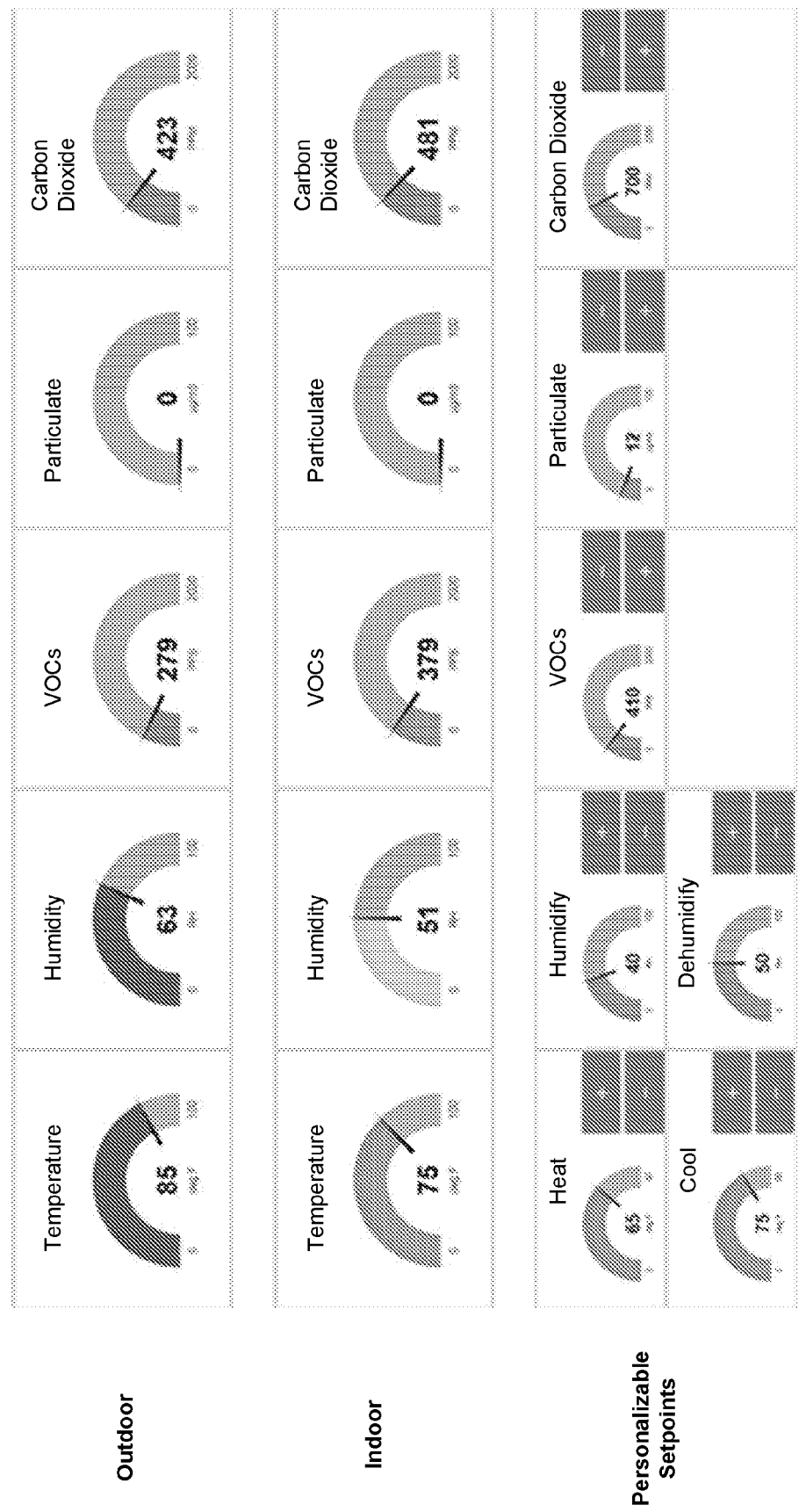

FIG. 6 includes an example user interface displayed by the customer device 524 during execution of the application based on data from the customer portal 528. It should be understood that the following functions are performed by the customer device 524 during execution of the application.

As shown in FIG. 6, the customer device 524 may display real-time values of the temperature, RH, amount of VOCs, amount of particulate, and amount of carbon dioxide (CO2) measured by the IAQ sensor module 304. In FIG. 6, these are illustrated in the row labeled "indoor" as they represent parameters within the building. The real-time values may be received by the customer device 524 from the monitoring server 508 via the customer portal 528.

The customer device 524 may also display real-time values of the temperature, RH, amount of VOCs, amount of particulate, and amount of carbon dioxide (CO2) measured outside of the building but within the predetermined geographical area including the geographical area of the building. In FIG. 6, these are illustrated in the row labeled "outdoor" as they represent parameters outside of the building. The real-time values may be received by the customer device 524 from the monitoring server 508 via the customer portal 528.

The customer device 524 may also display present setpoints for beginning heating (Heat) of the building, cooling (Cool) of the building, humidification (Humidify), dehumidification (Dehumidify), VOC removal (VOCs), particulate removal (Particulate), and carbon dioxide removal (Carbon Dioxide). In FIG. 6, these setpoints are illustrated in the row labeled "setpoints" as they represent setpoints for beginning associated mitigation actions within the building. The setpoints may be received by the customer device 524 from the monitoring server 508 via the customer portal 528.

A predetermined range for a measurement may be set based on the setpoint for a measurement. For example, a predetermined range for heating may be set to the temperature setpoint for heating plus and minus a predetermined amount. A predetermined range for cooling may be set to the temperature setpoint for cooling plus and minus a predetermined amount. The predetermined amount may be user adjustable in various implementations.

The customer device 524 also allows a user to adjust one or more of the present setpoints via the customer device 524. For example, the customer device 524 may provide positive and negative adjustment inputs in association with one, more than one, or all of the setpoints to allow for adjustment of the present setpoints. FIG. 6 includes the example of + serving as the positive adjustment input and − serving as the negative adjustment input. Adjustment inputs labeled and provided differently, however, may be used.

In response to receipt of input indicative of user interaction (e.g., touching, clicking, etc.) with an adjustment input associated with a setpoint, the customer device 524 may transmit a command to the monitoring server 508 to adjust (i.e., increment or decrement) the setpoint by a predetermined amount. For example, in response to receipt of input indicative of user interaction (e.g., touching, clicking, etc.) with the positive adjustment input associated with the heating temperature setpoint, the customer device 524 may transmit a command to the monitoring server 508 to increment the heating temperature setpoint by a first predetermined amount. In response to receipt of input indicative of user interaction (e.g., touching, clicking, etc.) with the negative adjustment input associated with the heating temperature setpoint, the customer device 524 may transmit a command to the monitoring server 508 to decrement the heating temperature setpoint by the first predetermined amount. As another example, in response to receipt of input indicative of user interaction (e.g., touching, clicking, etc.) with the positive adjustment input associated with the humidification RH setpoint, the customer device 524 may transmit a command to the monitoring server 508 to increment the humidification RH setpoint by a second predetermined amount. In response to receipt of input indicative of user interaction (e.g., touching, clicking, etc.) with the negative adjustment input associated with the humidification RH setpoint, the customer device 524 may transmit a command to the monitoring server 508 to decrement the humidification RH setpoint by the second predetermined amount.

The monitoring server 508 relays (transmits) received commands for adjusting setpoints to the thermostat 208 and/or the IAQ control module 404 via the internet 416. Alternatively, the customer device 524 may transmit commands for adjusting setpoints to the thermostat 208 and/or the IAQ control module 404 directly or via the internet 416. The thermostat 208 and/or the IAQ control module 404 adjust the associated setpoints in response to the commands received from the monitoring server 508.

Figure 7:
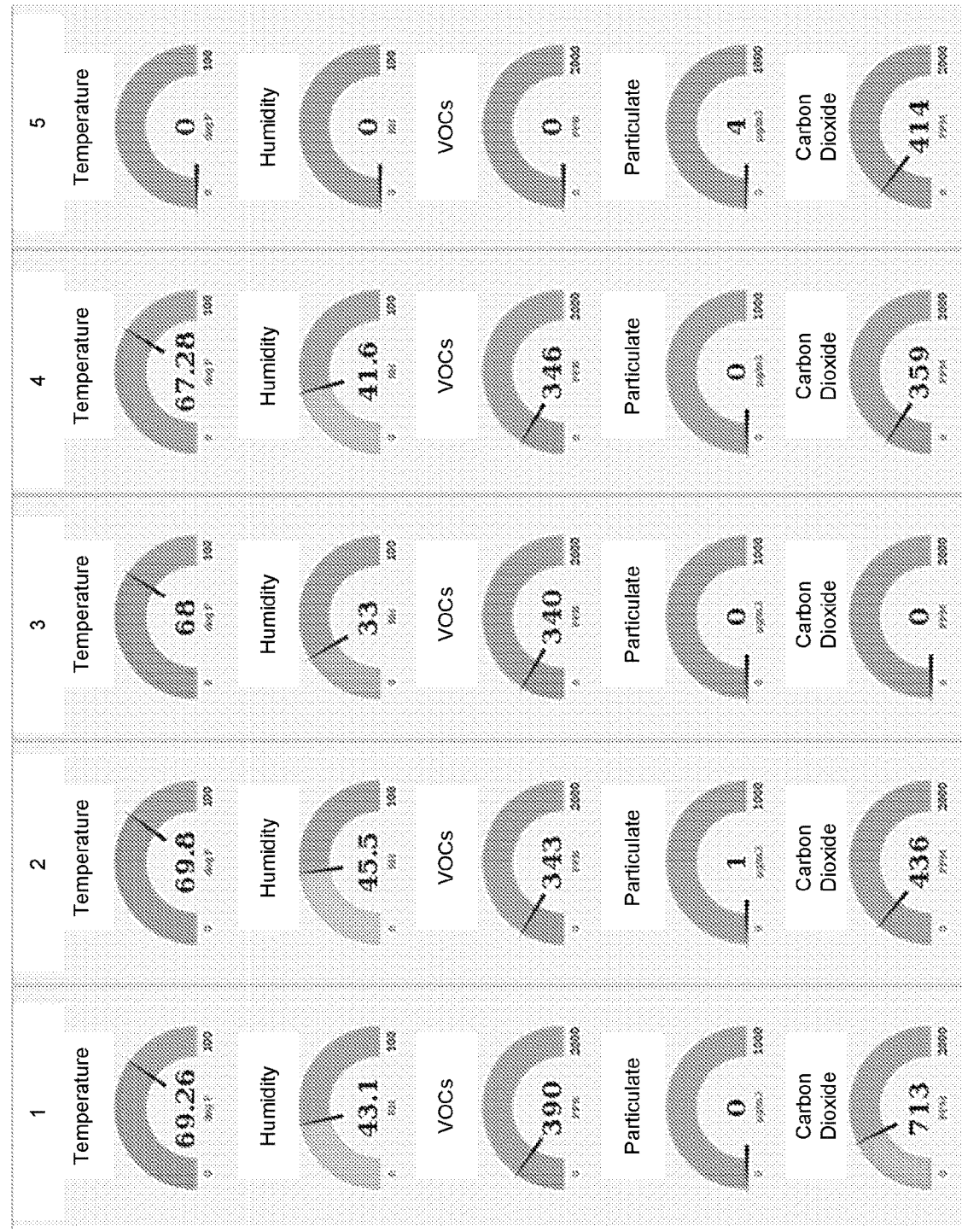

As discussed above, one or more than one IAQ sensor module 304 may be concurrently used within the building, such as in different rooms of the building. FIG. 7 includes an example user interface displayed by the customer device 524 during execution of the application when the building includes multiple IAQ sensor modules. In the example of FIG. 7, the measurements from each IAQ sensor module are shown in a separate column.

As also discussed above, one or more of the IAQ sensors may be omitted from an IAQ sensor module. For example, as shown in the right-most column of FIG. 7, the associated IAQ sensor module only includes a particulate sensor and a carbon dioxide sensor. The temperature, relative humidity, and VOCs of zero in the example of FIG. 7 indicate that the IAQ sensor module does not include a temperature sensor, a humidity sensor, or a VOC sensor.

Figure 8:
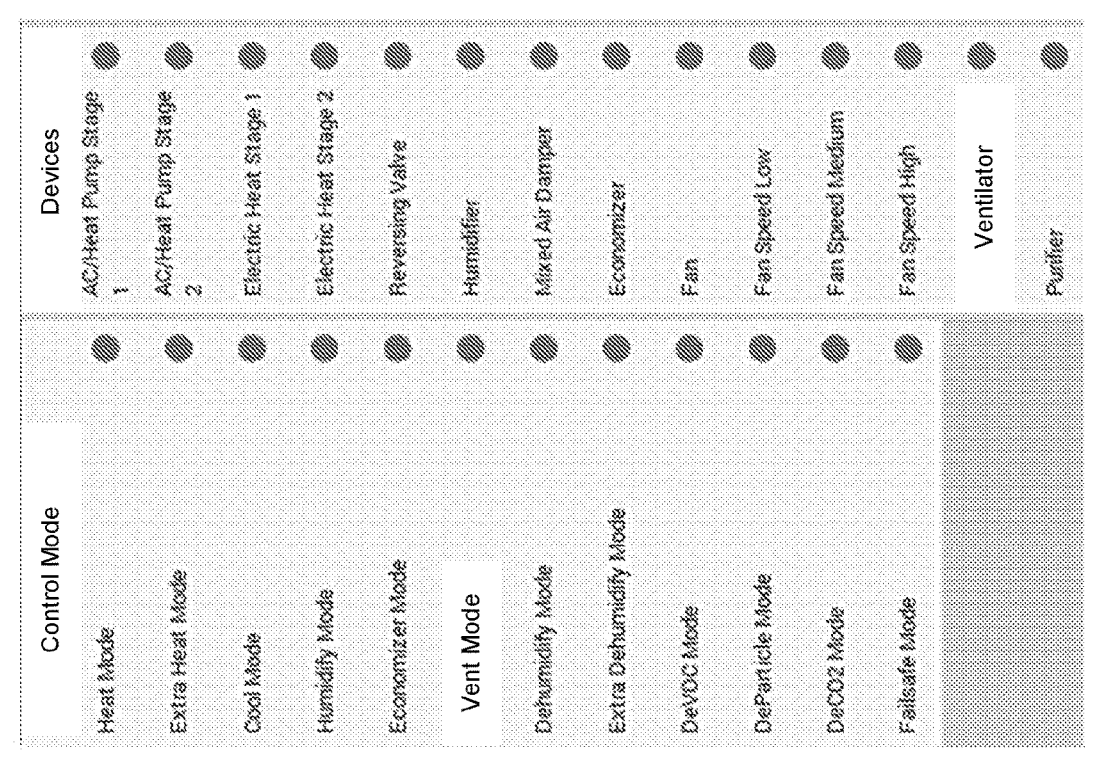

FIG. 8 includes an example user interface displayed by the customer device 524 during execution of the application based on additional data indicative of present statuses of control modes and present (operation) statuses of various devices and modes of devices of the building. The present statuses may be, for example, on or off. The present status of a control mode, device, or mode of a device may be on (currently in use) or off (not currently in use). One type of indicator may be used to indicate a present status of on, while another type of indicator may be used to indicate a present status of off. The customer device 524 may display the additional data concurrently with the data from one or more IAQ modules, the local data, and/or the setpoint data.

The customer device 524 selectively displays measurements of one or more IAQ sensor modules, local data, control modes, and/or statuses from a predetermined period of time. The predetermined period of time may be, for example, the present day, a predetermined number of days (including or not including the present day), a predetermined number of hours before a present time, a predetermined number of minutes before the present time, or another suitable period. By default, a predetermined period may be selected (e.g., the present day), but a user may select a different predetermined period and the customer device 524 may display the data for the selected predetermined period.

Figure 9:
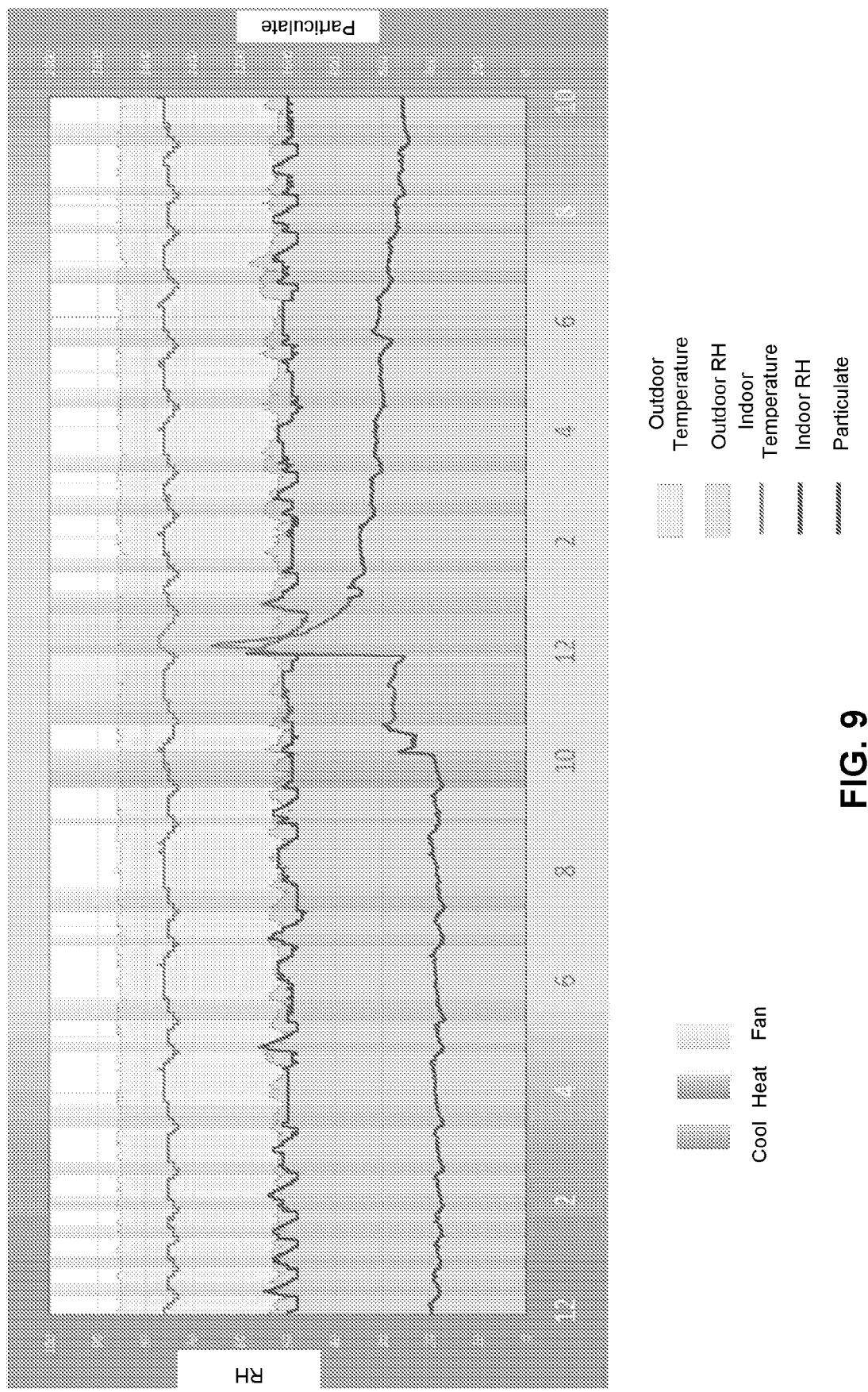

FIG. 9 includes an example user interface displayed by the customer device 524 during execution of the application for the present day (from 12:01 pm of the present day to the present time (approximately 10 pm in this example)). The customer device 524 displays data selected by a user of the customer device 524. By default, all data may be selected, but a user may select less than all of the data to be displayed, and the customer device 524 may display only the selected data.

For example, in FIG. 9, only outdoor temperature (from the local data), outdoor RH (from the local data), indoor temperature (from the IAQ sensor module 304), indoor RH (from the IAQ sensor module 304), and particulate (from the IAQ sensor module 304) are graphed over time. Indicators of the statuses of the cooling mode, the heating mode, and use of the circulator blower 108 are also concurrently shown over time. Indoor Carbon dioxide (from the IAQ sensor module 304, if measured) and indoor VOCs (from the IAQ sensor module 304, if measures) are not graphed over time in this example.

The customer device 524 selectively displays a user interface for user selection of a priority for mitigating deviations in IAQ parameters. For example, the customer device 524 may display a user interface that allows user assignment of an order of prioritization for: (i) temperature control: (ii) RH control; (iii) particulate control; (vi) VOC control; and (v) carbon dioxide control. Temperature control may refer to maintaining, as much as possible, the temperature within the building within a predetermined temperature range. RH control may refer to maintaining, as much as possible, the RH within the building within a predetermined temperature range. Particulate control may refer to maintaining, as much as possible, the amount of particulate within the building less than a predetermined amount of particulate. VOC control may refer to maintaining, as much as possible, the amount of VOCs within the building less than a predetermined amount of VOCs. Carbon dioxide control may refer to maintaining, as much as possible, the amount of carbon dioxide within the building less than a predetermined amount of carbon dioxide. The order of prioritization for (i)-(v) may be initially preset, but may be user selected, as stated above.

The thermostat 208 and/or the IAQ control module 404 may control the mitigation devices 424 based on the prioritization (order). For example, when particulate control is the first priority, the thermostat 208 may control the mitigation devices 424 to decrease particulate as quickly as possible as opposed to, for example, controlling the mitigation devices 424 to more quickly adjust temperature or RH or to more quickly decrease the amount of VOCs and/or the amount of carbon dioxide.

The user interfaces provided by the customer device 524 provide visual information to the user regarding real-time measurements, historical measurements over a period of time, trends, and efficacy of IAQ mitigation and control. The user interfaces also enable the user to adjust setpoints to be used to control the mitigation devices 424 to control comfort and IAQ within the building. The user interfaces also enable the user to adjust prioritization in which IAQ conditions are mitigated. All of the above improves IAQ within the building and user experience regarding IAQ within the building.

Figure 10:
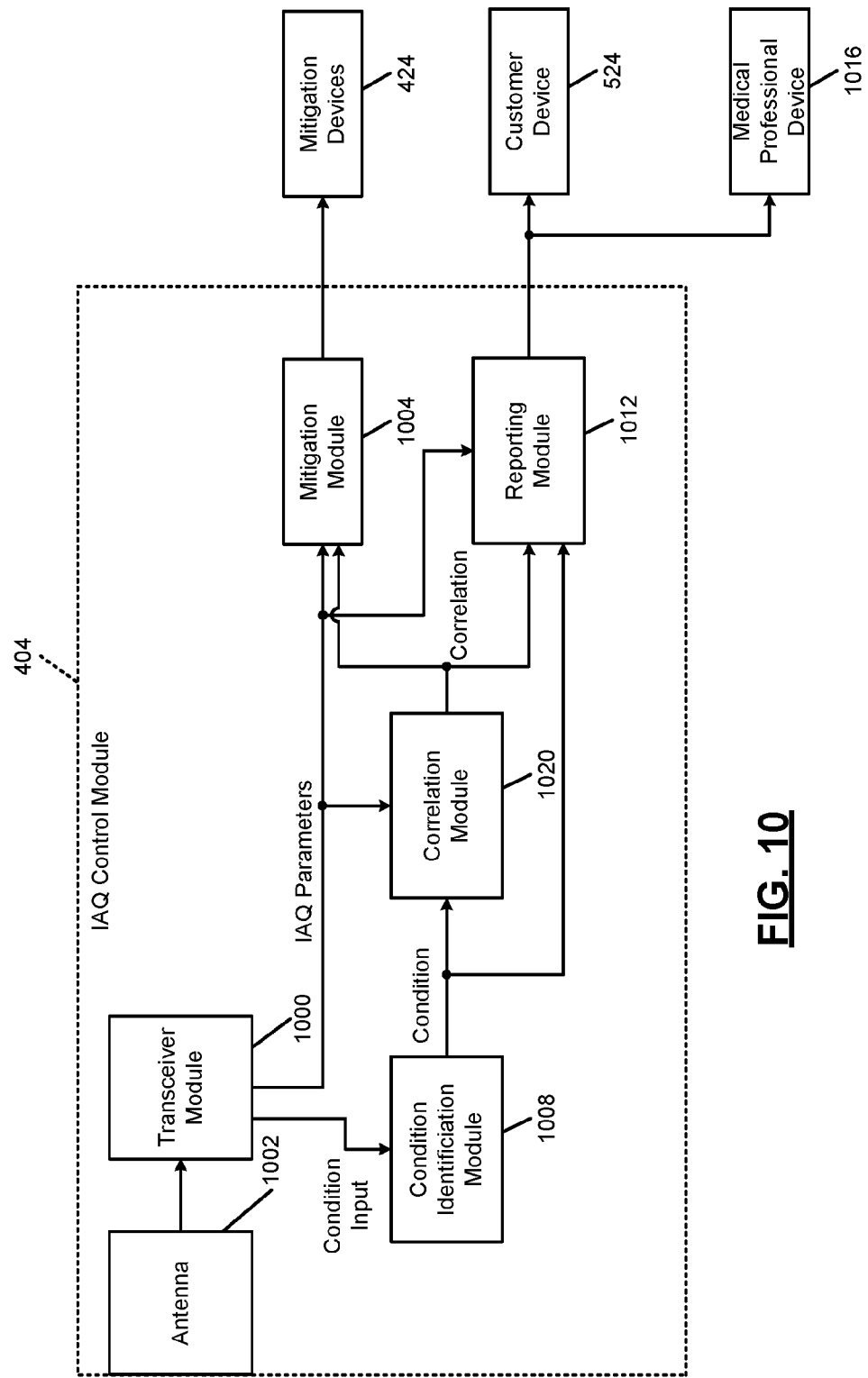
FIG. 10 includes a functional block diagram of an example implementation of a thermostat.

FIG. 10 includes a block diagram of an example implementation of a mitigation system using the example of the IAQ control module 404. While the example of the IAQ control module 404 is provided for purposes of discussion, the modules of the IAQ control module 404 may alternatively be implemented within the thermostat 208 or within a combination of the thermostat 208 and the IAQ control module 404.

A transceiver module 1000 receives the IAQ parameters from the IAQ sensor module 304 wirelessly or by wire. The transceiver module 1000 may receive the IAQ parameters wirelessly via one or more antennas, such as antenna 1002, using a proprietary or standardized, wired or wireless protocol, such as Bluetooth, ZigBee (IEEE 802.15.4), 900 Megahertz, 2.4 Gigahertz, WiFi (IEEE 802.11).

A mitigation module 1004 controls operation of the mitigation devices 424 based on the IAQ parameters, as discussed above. For example, the mitigation module 1004 may turn on heating of the building when the temperature is less than the lower limit of the predetermined range for heating. The mitigation module 1004 may turn on cooling when the temperature is greater than the upper limit of the predetermined range for cooling. The mitigation module 1004 may turn on the air cleaner/purifier 428 when the amount of particulate measured by the particulate sensor 316 is greater than a first predetermined amount of particulate. The mitigation module 1004 may leave the air cleaner/purifier 428 on until the amount of particulate measured by the particulate sensor 316 is less than a second predetermined amount of particulate that is less than the first predetermined amount of particulate. The mitigation module 1004 may turn the air cleaner/purifier 428 off when the amount of particulate measured by the particulate sensor 316 is less than the second predetermined amount of particulate. In various implementations, the mitigation module 1004 may vary the speed of the air cleaner/purifier 428 based on the amount of particulate measured by the particulate sensor 316. For example, the thermostat 208 may increase the speed of the air cleaner/purifier 428 as the amount of particulate increases and vice versa.

The mitigation module 1004 may turn the humidifier 432 on when the RH measured by the RH sensor 312 is less than the first predetermined RH. The mitigation module 1004 may leave the humidifier 432 on until the RH measured by the RH sensor 312 is greater than the second predetermined RH that is greater than the first predetermined RH. The mitigation module 1004 may turn the humidifier 432 off when the RH measured by the RH sensor 312 is greater than the second predetermined RH.

The mitigation module 1004 may turn the dehumidifier 436 on when the RH measured by the RH sensor 312 is greater than the third predetermined RH. The mitigation module 1004 may leave the dehumidifier 436 on until the RH measured by the RH sensor 312 is less than the fourth predetermined RH that is less than the third predetermined RH. The mitigation module 1004 may turn the dehumidifier 436 off when the RH measured by the RH sensor 312 is less than the fourth predetermined RH.

The mitigation module 1004 may turn the ventilator 440 on when the amount of VOCs measured by the VOC sensor 320 is greater than the first predetermined amount of VOCs. The mitigation module 1004 may leave the ventilator 440 on until the amount of VOCs measured by the VOC sensor 320 is less than the second predetermined amount of VOCs that is less than the first predetermined amount of VOCs. The mitigation module 1004 may turn the ventilator 440 off when the amount of VOCs measured by the VOC sensor 320 is less than the second predetermined amount of VOCs.

The mitigation module 1004 may turn the ventilator 440 on when the amount of carbon dioxide measured by the carbon dioxide sensor 324 is greater than the first predetermined amount of carbon dioxide. The mitigation module 1004 may leave the ventilator 440 on until the amount of carbon dioxide measured by the carbon dioxide sensor 324 is less than the second predetermined amount of carbon dioxide that is less than the first predetermined amount of carbon dioxide. The thermostat 208 may turn the ventilator 440 off when the amount of carbon dioxide measured by the carbon dioxide sensor 324 is less than the second predetermined amount of carbon dioxide.

The transceiver module 1000 also receives condition input from the condition sensors, such as at least one of the microphone 370, the camera 374, and the other types of condition sensors 378, wirelessly or by wire. The transceiver module 1000 may receive the condition input wirelessly via one or more antennas, such as the antenna 1002, using a proprietary or standardized, wired or wireless protocol, such as Bluetooth, ZigBee (IEEE 802.15.4), 900 Megahertz, 2.4 Gigahertz, WiFi (IEEE 802.11). Examples of other types of condition sensors 378 include user computing devices executing applications configured to generate condition input based on input to the user computing devices. A user can use a user computing device (e.g., a phone, tablet, thermostat, etc.) to manually flag when an individual is having a condition. The IAQ system records the date and time of the occurrence of the condition and can correlate the individual having the condition with one or more of the measured IAQ parameters without using input from the microphone 370 and the camera 374. For example, via a user computing device, a user may select condition input from one or more lists (e.g., a drop down menu in an application having different conditions, such as coughing, sneezing, wheezing, etc.) or manually or verbally input condition input. The condition input may additionally include a severity of a condition, such as a value (e.g., 1 to 10) where an increase in the value is indicative of an increase in severity of the condition. In various implementations, condition input from one or more condition sensors may be supplemented with condition input from a user computing device.

A condition identification module 1008 identifies the occurrence of a physical condition of a user based on the condition input. For example, the condition identification module 1008 may identify the occurrence of a user coughing, the occurrence of a user wheezing, the occurrence of a user sneezing, the occurrence of a user having watery eyes, and/or the occurrence of a user having another condition that may be related to IAQ.

The condition identification module 1008 may identify the occurrence of a user coughing, for example, based on the signal from the microphone 370 having predetermined characteristics of a cough. The condition identification module 1008 may identify the occurrence of a user sneezing, for example, based on the signal from the microphone 370 having predetermined characteristics of a sneeze. The condition identification module 1008 may identify the occurrence of a user wheezing, for example, based on the signal from the microphone 370 having predetermined characteristics of wheezing. The condition identification module 1008 may identify the occurrence of a user having watery eyes, for example, based on one or more images from the camera 374 having predetermined characteristics of watery eyes. The condition identification module 1008 may identify the occurrence of an asthmatic event of a user in response to a signal from a medical device (another type of condition sensors 378, such as an inhaler) indicative of administration of an asthma treatment medication. The condition identification module 1008 may generate a condition signal in response to the occurrence of a physical condition of a user.

A reporting module 1012 may transmit the IAQ parameters and the occurrence of conditions identified by the condition identification module 1008 to the customer device 524. The customer device 524 may display the IAQ parameters and indicators of the conditions identified on a display of the customer device 524 or the thermostat 208.

The reporting module 1012 may also transmit the IAQ parameters and the occurrence of conditions identified by the condition identification module 1008 to one or more other computing devices, such as a medical professional computing device 1016 associated with one or more medical professionals, such as one or more doctors. Based on the received data, the one or more medical professionals may diagnose the presence of a relationship between one or more IAQ parameters and the occurrence of a physical condition. The reporting module 1012 may transmit data via the transceiver module 1000 or via another transceiver.

Figure 11:
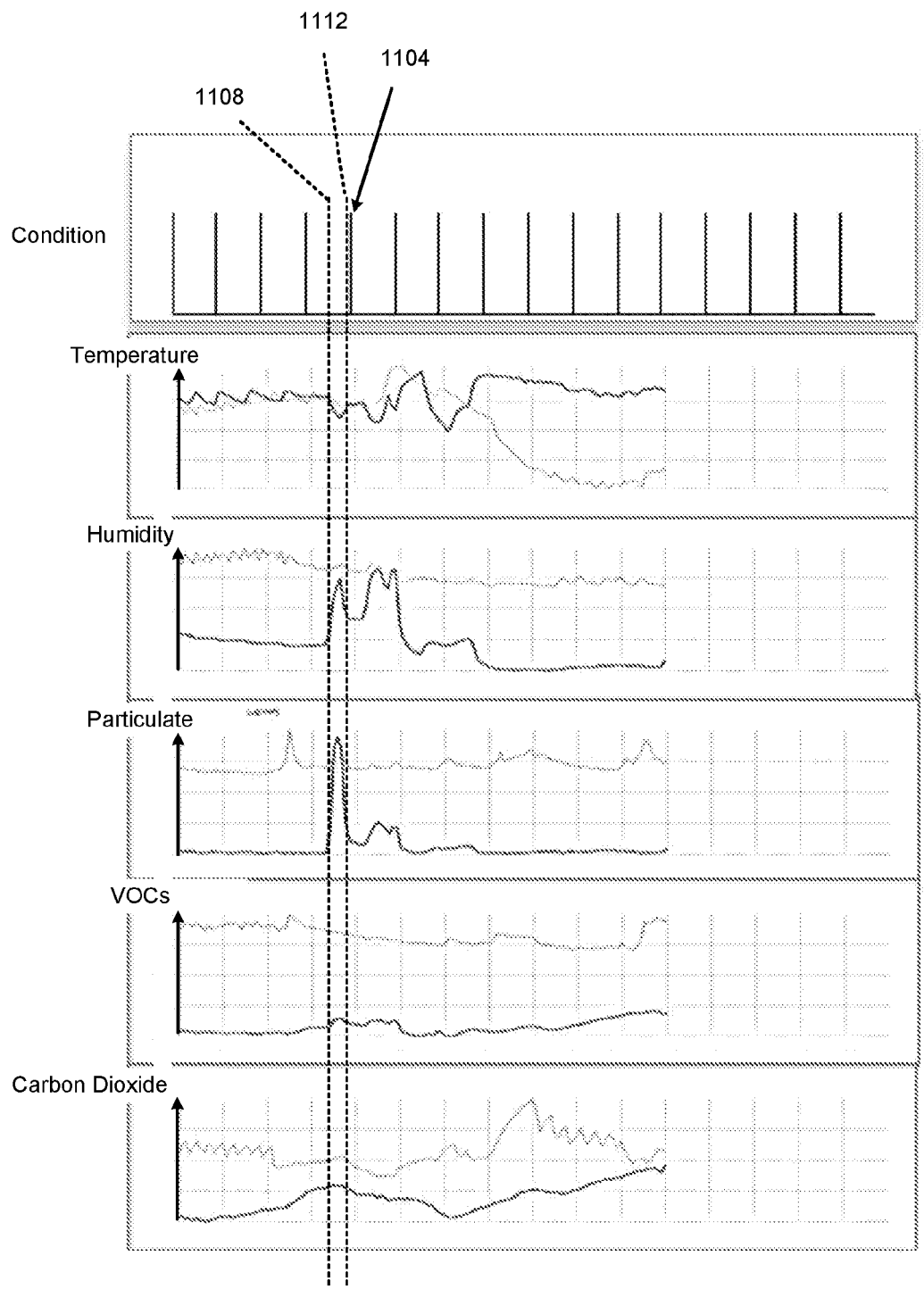
FIG. 11 includes example graphs of particulate, volatile organic compounds (VOCs), carbon dioxide (CO2), and instances of the occurrence of a physical condition of a user over time.

FIG. 11 includes example graphs of temperature, RH, amount of particulate, amounts of VOCs, and amount of carbon dioxide over time. FIG. 11 also includes an example graph of occurrence of a physical condition by a user over time. The visualization of the IAQ parameters along with the accompanying indications of occurrence of the physical condition may help the user identify possible causes of the occurrence of the physical condition. Because the IAQ sensor module 304 is portable, this may help the user and/or one or more medical professionals identify possible causes of the occurrence of the physical condition even outside of the building.

Referring back to FIG. 10, a correlation module 1020 may also be implemented. The correlation module 1020 may identify a correlation between one or more of the IAQ parameters and the occurrence of a physical condition. For example, with respect to FIG. 11, an occurrence of a physical event (e.g., coughing) occurred at 1104 shortly after rises in RH and amount of particulate occurred between times 1108 and 1112. When, on at least a predetermined number of occasions, the physical event occurs within a predetermined period after a predetermined change in one or more of the IAQ parameters, the correlation module 1020 may identify a correlation between the one or more of the IAQ parameters and the occurrence of the physical event. For example, the correlation module 1020 may identify a correlation between coughing and high amounts of particulate matter when, on at least a predetermined number of occasions of the amount of particulate matter being greater than the predetermined amount of particulate, user coughing occurs within a predetermined period after the amount of particulate matter becomes greater than the predetermined amount of particulate.

One or more actions may be taken in response to the identification of a correlation. For example, the reporting module 1012 may also transmit identified correlations to the customer device 524 and/or the medical professional device 1016. Additionally or alternatively, the mitigation module 1004 may adjust control of one or more of the mitigation devices 424 based on the identified correlation. For example, when the correlation module 1020 identifies a correlation between coughing and high amounts of particulate matter, the mitigation module 1004 may decrease the first predetermined amount of particulate. Based on the decrease in the first predetermined amount of particulate, the mitigation module 1004 may turn on the air cleaner/purifier 428 sooner (i.e., when the amount of particulate is lower). This may help prevent the occurrence of the physical condition in the future.

After the adjustment, the mitigation module 1004 may monitor whether the correlation continues. If so, the mitigation module 1004 may further adjust control of one or more of the mitigation devices. If not, the adjustment may have helped prevent the occurrence of the physical condition. The reporting module 1012 may transmit data indicative of the correlation identified, the adjustment, and the response to the adjustment to the customer device 524 and/or the medical professional device 1016.

Figure 12:
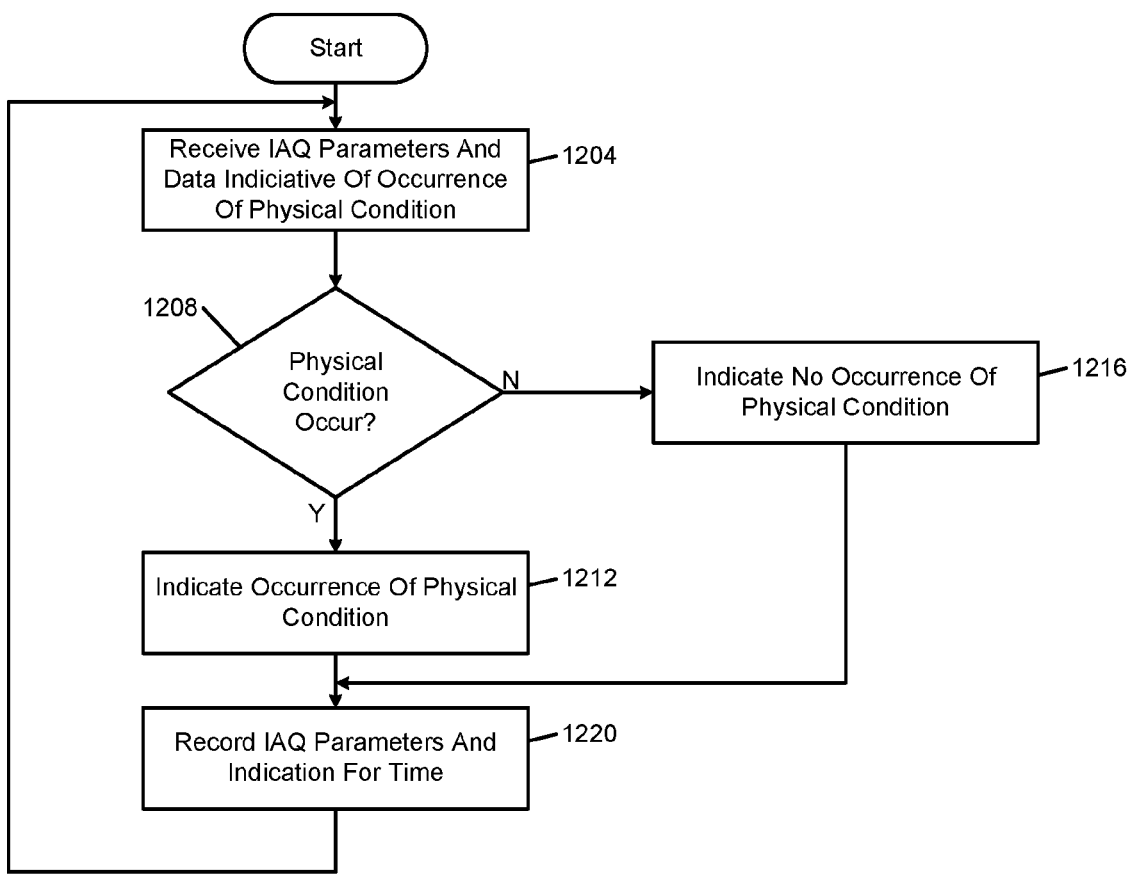
FIG. 12 includes a flowchart depicting an example method of identifying occurrences of physical conditions and recording IAQ parameters and identified occurrences of physical conditions of users.

FIG. 12 includes a flowchart depicting an example method of identifying occurrences of physical conditions and recording IAQ parameters and identified occurrences of physical conditions of users. Control begins with 1204 where the reporting module 1012 receives the IAQ parameters and the condition identification module 1008 receives the condition input. At 1208, the condition identification module 1008 determines whether one or more components of the condition input is indicative of the occurrence of a physical condition of a user. If 1208 is true, the condition identification module 1008 indicates the occurrence of the physical condition at 1212, and control continues with 1220. If 1208 is false, the condition identification module 1008 indicates the non-occurrence of the physical condition 1212 at 1216, and control continues with 1220. At 1220, the reporting module 1012 records, in association with the present time, the IAQ parameters and the indication of whether or not the physical condition occurred. Control may then return to 1204. While not shown in FIG. 12, the mitigation module 1004 may control operation of the mitigation devices 424 based on the IAQ parameters, as discussed above.

In response to a request for data from the customer device 524 or continuously, the reporting module 1012 transmits to the customer device 524 the stored IAQ parameters and indications from a predetermined period before the present time, inclusive. The customer device 524 displays graphs of the stored IAQ parameters and indications over time on a display.

Figure 13:
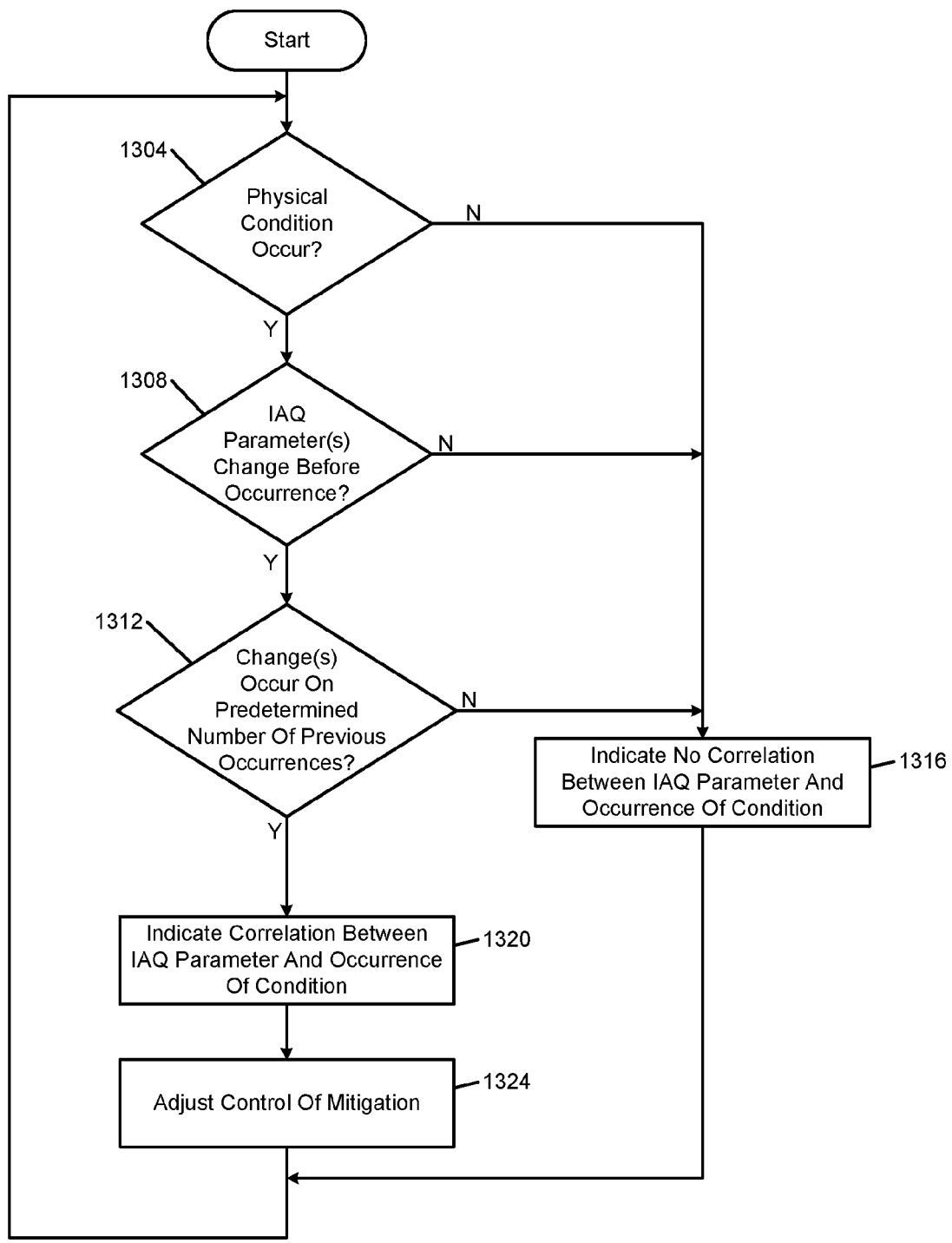
FIG. 13 includes a flowchart depicting an example method of identifying correlations between IAQ parameters and occurrences of a physical condition of a user.

FIG. 13 includes a flowchart depicting an example method of identifying correlations between IAQ parameters and occurrences of a physical condition of a user. Control begins with 1304 where the condition identification module 1008 determines whether a physical condition of the user has occurred. If 1304 is true, control continues with 1308. If 1304 is false, control transfers to 1316, which is discussed further below.

At 1308, the correlation module 1020 obtains the stored IAQ parameters from a predetermined period (e.g., 1 minute, 30 seconds, 15 seconds, etc.) before the occurrence of the physical condition. The correlation module 1020 determines whether one or more of the IAQ parameters changed within the predetermined period before the occurrence of the physical condition. Additionally or alternatively, the correlation module 1020 may determine whether one or more of the IAQ parameters were outside of the predetermined ranges (in the examples of temperature and humidity) or greater than the predetermined values (in the examples of amount of particulate, amount of VOCs, and amount of carbon dioxide) during the predetermined period before the occurrence of the physical condition. If 1308 is true, control may continue with 1312. In various implementations, 1312 may be omitted, and control may transfer to 1320 when 1308 is true. If 1308 is false, control may transfer to 1316.

At 1312, the correlation module 1020 may determine whether, on at least a predetermined number of previous occurrences of the physical condition, the one or more of the IAQ parameters changed within the predetermined period before those occurrences of the physical condition. Additionally or alternatively, the correlation module 1020 may determine whether, on at least the predetermined number of previous occurrences of the physical condition, the one or more of the IAQ parameters were outside of the respective predetermined ranges or greater than the respective predetermined values during the predetermined period before those occurrence of the physical condition. If 1312 is true, control may continue with 1320. If 1312 is false, the correlation module 1020 may indicate that no correlation is present between the IAQ parameters and the occurrence of the physical condition at 1316, and control may return to 1304.

At 1320, the correlation module 1020 indicates that a correlation is present between the one or more of the IAQ parameters and the occurrence of the physical condition. The reporting module 1012 may transmit, to the customer device 524 and/or the medical professional device 1016, the diagnosis of the correlation and the underlying data for the one or more of the IAQ parameters and the occurrence(s) of the physical condition. At 1324, the mitigation module 1004 may adjust one or more mitigation parameters based on the identified correlation between the one or more of the IAQ parameters and the occurrence of the physical condition. For example, the mitigation module 1004 may adjust one or more of the respective predetermined values or respective predetermined ranges associated with the one or more of the IAQ parameters. For example, if the correlation module 1020 identifies a correlation between high amounts of particulate and coughing, the mitigation module 1004 may decrease the predetermined amount of particulate at which the mitigation module 1004 begins mitigation of PM, such as by turning on the air cleaner/purifier 428. This may help prevent future occurrences of the physical condition. In various implementations, 1324 may be omitted.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An indoor air quality (IAQ) system for a building, comprising:
   at least one of:
      a temperature sensor configured to measure a temperature of air at the temperature sensor;
      a relative humidity (RH) sensor configured to measure a RH of air at the RH sensor;
      a particulate sensor configured to measure an amount of particulate of at least a predetermined size present in air at the particulate sensor;
      a volatile organic compound (VOC) sensor configured to measure an amount of VOCs present in air at the VOC sensor; and
      a carbon dioxide sensor configured to measure an amount of carbon dioxide present in air at the carbon dioxide sensor;
   at least one of:
      a microphone; and
      a camera;
   a condition identification module configured to, based on output from the at least one of the microphone and the camera, indicate an occurrence of a user having a physical condition;
   a correlation module configured to, based on the occurrence of the user having the physical condition and the at least one of the temperature, the RH, the amount of particulate, the amount of VOCs, and the amount of carbon dioxide, selectively identify the presence of a correlation between the occurrence of the user having the physical condition and the at least one of the temperature, the RH, the amount of particulate, the amount of VOCs, and the amount of carbon dioxide; and
   a mitigation module configured to selectively turn on and off at least one of a plurality of mitigation devices based on the at least one of the temperature, the RH, the amount of particulate, the amount of VOCs, and the amount of carbon dioxide,
   wherein the mitigation module is configured to:
      adjust a threshold value in response to the identification of the presence of the correlation; and
      turn on the at least one of the plurality of mitigation devices when the at least one of the temperature, the RH, the amount of particulate, the amount of VOCs, and the amount of carbon dioxide is greater than the threshold value.

2. The IAQ system of claim 1 wherein the condition identification module is configured to indicate the occurrence of the user at least one of coughing, wheezing, and sneezing based on a comparison the output from at least one of the microphone and the camera with predetermined output indicative of the at least one of coughing, wheezing, and sneezing.

3. The IAQ system of claim 1 wherein the condition identification module is configured to indicate the occurrence of the user having watery eyes based on at least one of (a) receipt of user input indicative of the user having watery eyes and (b) a comparison of the output from the camera with predetermined output indicative of watery eyes.

4. The IAQ system of claim 1 further comprising an IAQ sensor module comprising:
the at least one of the temperature sensor, the RH sensor, the particulate sensor, the VOC sensor, and the carbon dioxide sensor; and
at least one of the microphone and the camera.

5. The IAQ system of claim 1 further comprising:
an IAQ sensor module comprising the at least one of the temperature sensor, the RH sensor, the particulate sensor, the VOC sensor, and the carbon dioxide sensor,
wherein at least one of the microphone and the camera is implemented separately from the IAQ sensor module.

6. The IAQ system of claim 1 further comprising:
a first transceiver configured to wirelessly transmit, via at least one antenna, the at least one of the temperature, the RH, the amount of particulate, the amount of VOCs, and the amount of carbon dioxide; and
a second transceiver configured to wirelessly receive, from the first transceiver via at least one antenna, the at least one of the temperature, the RH, the amount of particulate, the amount of VOCs, and the amount of carbon dioxide,
wherein the condition identification module receives the at least one of the temperature, the RH, the amount of particulate, the amount of VOCs, and the amount of carbon dioxide from the second transceiver.

7. The IAQ system of claim 1 wherein the correlation module is configured to selectively identify the presence of the correlation in response to the at least one of the temperature, the RH, the amount of particulate, the amount of VOCs, and the amount of carbon dioxide changing by at least a predetermined amount during a predetermined period before the occurrence of the user having the physical condition.

8. The IAQ system of claim 1 wherein the correlation module is configured to selectively identify the presence of the correlation in response to the at least one of the temperature, the RH, the amount of particulate, the amount of VOCs, and the amount of carbon dioxide being, within a predetermined period before the occurrence of the user having the physical condition, one of:
greater than a predetermined value; and
outside of a predetermined range.

9. The IAQ system of claim 1 further comprising a computing device having a display, the computing device being configured to selectively display, on the display:
the at least one of the RH, the amount of particulate, the amount of VOCs, and the amount of carbon dioxide over a period of time; and
indicators of the occurrence of the user having the physical condition over the period of time.

10. The IAQ system of claim 1 wherein the condition identification module configured to indicate an occurrence of a user having a physical condition in response to receipt of user input indicative of the user having the physical condition from a user computing device executing an application.

11. A method, comprising:
at least one of:
by a temperature sensor within a building, measuring a temperature of air at the temperature sensor within a building;
by a relative humidity (RH) sensor within the building, measuring a RH of the air at the RH sensor;
by a particulate sensor within the building, measuring an amount of particulate of at least a predetermined size present in the air at the particulate sensor;
by a volatile organic compound (VOC) sensor within the building, measuring an amount of VOCs present in the air at the VOC sensor; and
by a carbon dioxide sensor within the building, measuring an amount of carbon dioxide present in the air at the carbon dioxide sensor;
based on output from at least one of a microphone and a camera, indicating an occurrence of a user having a physical condition;
based on the occurrence of the user having the physical condition and the at least one of the temperature, the RH, the amount of particulate, the amount of VOCs, and the amount of carbon dioxide, selectively identifying the presence of a correlation between the occurrence of the user having the physical condition and the at least one of the temperature, the RH, the amount of particulate, the amount of VOCs, and the amount of carbon dioxide;
selectively turning on and off at least one of a plurality of mitigation devices based on the at least one of the temperature, the RH, the amount of particulate, the amount of VOCs, and the amount of carbon dioxide;
adjusting a threshold value in response to the identification of the presence of the correlation; and
turning on the at least one of the plurality of mitigation devices when the at least one of the temperature, the RH, the amount of particulate, the amount of VOCs, and the amount of carbon dioxide is greater than the threshold value.

12. The method of claim 11 wherein the indicating an occurrence of a user having a physical condition includes indicating the occurrence of the user at least one of coughing, wheezing, and sneezing based on a comparison the output from at least one of the microphone and the camera with predetermined output indicative of the at least one of coughing, wheezing, and sneezing.

13. The method of claim 11 wherein the indicating an occurrence of a user having a physical condition includes indicating the occurrence of the user having watery eyes based on at least one of (a) receiving user input indicative of the user having watery eyes and (b) a comparison of the output from the camera with predetermined output indicative of watery eyes.

14. The method of claim 11 further comprising:
receiving, from an indoor air quality (IAQ) sensor module, the at least one of the temperature, the RH, the amount of particulate, the amount of VOCs, and the amount of carbon dioxide, the IAQ sensor module including the at least one of the temperature sensor, the RH sensor, the particulate sensor, the VOCs sensor, and the carbon dioxide sensor; and
receiving, from the IAQ sensor module, the output of at least one of the microphone and the camera,
the IAQ sensor module including the at least one of the microphone and the camera.

15. The method of claim 11 further comprising:
wirelessly transmitting, by a first transceiver via at least one antenna, the at least one of the temperature, the RH, the amount of particulate, the amount of VOCs, and the amount of carbon dioxide;
wirelessly receiving, by a second transceiver via at least one antenna, the at least one of the temperature, the RH, the amount of particulate, the amount of VOCs, and the amount of carbon dioxide; and receiving the at least one of the temperature, the RH, the amount of particulate, the amount of VOCs, and the amount of carbon dioxide via the second transceiver.

16. The method of claim 11 wherein selectively identifying the presence of a correlation includes selectively identifying the presence of a correlation in response to the at least one of the temperature, the RH, the amount of particulate, the amount of VOCs, and the amount of carbon dioxide changing by at least a predetermined amount during a predetermined period before the occurrence of the user having the physical condition.

17. The method of claim 11 wherein selectively identifying the presence of a correlation includes selectively identifying the presence of a correlation in response to the at least one of the temperature, the RH, the amount of particulate, the amount of VOCs, and the amount of carbon dioxide being, within a predetermined period before the occurrence of the user having the physical condition, one of:

greater than a predetermined value; and outside of a predetermined range.

18. The method of claim 11 further comprising selectively displaying on a display of a computing device:

the at least one of the RH, the amount of particulate, the amount of VOCs, and the amount of carbon dioxide over a period of time; and indicators of the occurrence of the user having the physical condition over the period of time.

19. The method of claim 14 wherein the indicating an occurrence of a user having a physical condition includes indicating the occurrence of the user having the physical condition in response to receipt of user input indicative of the user having the physical condition from a user computing device executing an application.

* * * * *